(12) United States Patent
Lu et al.

(10) Patent No.: US 11,868,985 B2
(45) Date of Patent: Jan. 9, 2024

(54) ONLINE TRANSACTION METHOD, VISUAL FINANCIAL IC CARD, CLIENT, AND SERVER

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 147 days.

(21) Appl. No.: 16/307,196

(22) PCT Filed: Jul. 21, 2017

(86) PCT No.: PCT/CN2017/093923
§ 371 (c)(1),
(2) Date: Dec. 5, 2018

(87) PCT Pub. No.: WO2018/028418
PCT Pub. Date: Feb. 15, 2018

(65) Prior Publication Data
US 2019/0164149 A1    May 30, 2019

(30) Foreign Application Priority Data
Aug. 11, 2016   (CN) .......................... 201610658909.5

(51) Int. Cl.
G06Q 20/12     (2012.01)
G06Q 20/34     (2012.01)
G06Q 20/40     (2012.01)

(52) U.S. Cl.
CPC ........... G06Q 20/351 (2013.01); G06Q 20/12 (2013.01); G06Q 20/34 (2013.01);
(Continued)

(58) Field of Classification Search
None
See application file for complete search history.

(56) References Cited

U.S. PATENT DOCUMENTS 6,327,578 B1 * 12/2001 Linehan ................ G06Q 20/02
                                                      705/65
7,103,575 B1 *  9/2006 Linehan ............ G06Q 30/0601
                                                    705/26.1
(Continued)

FOREIGN PATENT DOCUMENTS

CN        104021473 A  *  9/2014
CN        104021473 A  *  9/2014  ............. G06Q 20/40
WO    WO-2012153259 A1 * 11/2012  ........... G06Q 20/325

OTHER PUBLICATIONS

Hamann, E.-M. et al., "Securing e-business applications using smart cards", IBM Systems Journal (vol. 40, Issue: 3, pp. 635-647) (Year: 2001).*

*Primary Examiner* — Neha Patel
*Assistant Examiner* — Clay C Lee
(74) *Attorney, Agent, or Firm* — Hammer & Associates, P.C.

(57) ABSTRACT

A method of online transaction, in which a visual financial IC card receives transaction transferring data from a client, obtains transaction data, receive an online PIN from a user, obtains online PIN ciphertext by encrypting, executes behavior analyzing to obtain a card behavior analyzing result, sets a first transaction result, organizes message according to the transaction data, the online PIN ciphertext, the card behavior analyzing result and the first transaction result, and sends the message to the client; receives an online response package sent by the client, executes completing process to obtain a completing process result, sets a second transaction result, displays a corresponding information, organizes a data package according to the second transaction (Continued)

result and the completing process result, and sends the data package to the client. In this invention, any transaction terminal is avoided to improve security and convenience of the online financial IC card transaction.

6 Claims, 8 Drawing Sheets

(52) U.S. Cl.
CPC ..... *G06Q 20/4012* (2013.01); *G06Q 20/4016* (2013.01); *G06Q 20/40145* (2013.01)

(56) References Cited

U.S. PATENT DOCUMENTS

| | | | | |
|---|---|---|---|---|
| 9,317,845 | B1* | 4/2016 | Ekselius | G06Q 20/204 |
| 2005/0182927 | A1* | 8/2005 | Shatford | G07F 7/1008 |
| | | | | 713/159 |
| 2007/0290049 | A1* | 12/2007 | Ratcliffe | G06K 19/07703 |
| | | | | 235/492 |
| 2008/0099556 | A1* | 5/2008 | Park | G07F 7/0806 |
| | | | | 235/492 |
| 2010/0241572 | A1* | 9/2010 | Yuan | G06Q 20/02 |
| | | | | 705/75 |
| 2013/0001304 | A1* | 1/2013 | Xu | G06Q 20/38215 |
| | | | | 235/380 |
| 2013/0080238 | A1* | 3/2013 | Kelly | G06Q 20/352 |
| | | | | 705/14.31 |
| 2014/0156535 | A1* | 6/2014 | Jabbour | G06Q 20/4012 |
| | | | | 705/72 |
| 2014/0158759 | A1* | 6/2014 | Smets | G06Q 20/34 |
| | | | | 235/379 |
| 2017/0357979 | A1* | 12/2017 | Khurana | H04L 63/0853 |

* cited by examiner

ONLINE TRANSACTION METHOD, VISUAL FINANCIAL IC CARD, CLIENT, AND SERVER

FIELD OF THE INVENTION

The present invention relates to a method of online transaction, a visual financial IC card, a client and a server, which belongs to the field of information security.

BACKGROUND OF THE INVENTION

The improvement of informatization of financial industry requires higher level of security. Many domestic or foreign banks release financial IC cards instead of traditional magnetic stripe cards. Financial IC card, which is called chip card, uses a chip as media. With mass storage, the chip card can store information such as key, digital certificate and fingerprint. Loaded with electronic paper technology, the chip card can display non-sensitive information such as remaining balance of e-cash, transaction details and default data of card issuer, and the like.

The financial IC card in the prior art requires a POS machine to implement transaction, which is poor in security and convenience.

SUMMARY OF THE INVENTION

The object of the present invention is to provide a method of online transaction, a visual financial IC card, a client and a server, which can implement online transaction without POS machine and improve convenience and security of financial IC card transaction.

According an aspect of the present invention, the present invention provides an online transaction method, includes:
  Step S1, receiving, by a visual financial IC card, transaction transferring data sent from a client, obtaining transaction data from the transaction transferring data;
  Step S2, receiving, by the visual financial IC card, an online PIN entered by a user, encrypting the online PIN to obtain online PIN ciphertext;
  Step S3, performing, by the visual financial IC card, behavior analyzing to obtain a card behavior analyzing result, setting a first transaction result according to the card behavior analyzing result, organizing a message according to the first transaction result, the card behavior analyzing result, the transaction data and the online PIN ciphertext, sending the message to the client;
  Step S4, receiving, by the visual financial IC card, an online response package sent from the client, executing completing processing operation according to the online response package to obtain a completing processing result, setting a second transaction result according to the completing processing result, displaying corresponding information according to the second transaction result; and
  Step S5, organizing, by the visual financial IC card, a data package according to the second transaction result and the completing processing result, sending the data package to the client.

Preferably, in the above method, after Step S1, the method further includes: determining, by the visual financial IC card, whether the transaction transferring data is complete, if yes, executing Step S2, otherwise, returning error information to the client, ending process.

Specifically, the transaction transferring data includes APDU instruction and transaction data, the APDU instruction includes transaction data length; determining whether the transaction transferring data is complete specifically includes: determining whether the length of the transaction data is equal to the transaction data length, if yes, determining that the transaction transferring data is complete; otherwise, the transaction transferring data is determined to be incomplete.

Preferably, after Step S1, the method further includes: the visual financial IC card determines whether the format of the transaction transferring data is correct, if yes, executing Step S2; otherwise, returning error information to the client; end process;

Specifically, the transaction data includes: transaction amount and transaction type; determining whether the format of the transaction transferring data is correct specifically includes: determining whether the transaction amount and the transaction type are matched, if yes, the format of the transaction transferring data is correct; otherwise, the format of the transaction transferring data is not correct;

More specifically, determining whether the transaction amount and the transaction type are matched specifically includes: determining whether the transaction amount is zero in the case that the transaction type is consumption, if yes, the transaction amount and the transaction type are determined not to be matched; otherwise, the transaction amount and the transaction type are determined to be matched; determining whether the transaction amount is zero in the case that the transaction type is checking main account balance, if yes, the transaction amount and the transaction type are matched; otherwise, the transaction amount and the transaction type are not matched.

Preferably, the transaction data can include transaction amount; before receiving the online PIN input by the user the method further includes: determining, by the visual financial IC card, whether requires the user to confirm the transaction amount, if no, receiving the online PIN input by the user; if yes, displaying the transaction amount, waiting for receiving the transaction amount confirming information input by the user; if the transaction amount confirming information is received, executing receiving the online PIN input by the user; if the transaction amount confirming information is not received, returns error information to the client; ending process;

Specifically, the transaction data further includes transaction type; determining whether requires the user to confirm transaction amount specifically includes: determining, by the visual financial IC card, the transaction type, if the transaction type is consumption, it requires the user to confirm the transaction amount; if the transaction type is checking main account balance, it does not require the user to confirm the transaction amount.

Preferably, the transaction data can include transaction amount;

before receiving the online PIN entered by the user, the method further includes following steps:
  Step 1-1, determining, by the visual financial IC card, whether the transaction amount is more than a preset amount, if yes, receiving the online PIN entered by the user; otherwise, executing step 1-2; and
  Step 1-2, determining, by the visual financial IC card, whether a cached online PIN exists, if yes, reading the cached online PIN, encrypting the online PIN to obtain the online PIN ciphertext, executing step S3; otherwise, receiving the online PIN entered by the user;

Correspondingly, after receiving the online PIN entered by the user, the method further includes: caching the online PIN.

Preferably, in the above mentioned method, the card behavior result includes application ciphertext;

setting the first transaction result according to the card behavior analyzing result specifically comprises: checking, by the visual financial IC card, the application ciphertext in the card behavior analyzing result, setting the first transaction result as an online requirement in the case that the application ciphertext is authorization request ciphertext; setting the first transaction result as refusing transaction in the case that the application ciphertext is application authentication ciphertext;

Specifically, when the first transaction result is refusing transaction, after Step S3, the method further includes: refusing, by the visual financial IC card, transaction, displaying information of refusing transaction, ending process.

Preferably, in the method, organizing the message according to the first transaction result, the card behavior analyzing result, the transaction data and the online PIN ciphertext specifically includes following steps:

2-1) organizing, by the visual financial IC card, transaction message according to the first transaction result, the card behavior analyzing result, the transaction data, and sending the transaction message to the client; and 2-2) receiving, by the visual financial IC card, an instruction request sent by the client, organizing the response message according to the online PIN ciphertext, sending the response message to the client.

Preferably, in the method, the completing processing result comprises application ciphertext; setting the second transaction result according to the completing processing result specifically includes: checking, by the visual financial IC card, the application ciphertext in the completing processing result, setting the second transaction result as transaction approval in the case that the application ciphertext is transaction certificate, setting the second transaction result as refusing transaction in the case that the application ciphertext is application authentication ciphertext;

specifically, displaying corresponding information according to the second transaction result specifically includes: displaying, by the visual financial IC card, information of successful transaction in the case that the second transaction result is transaction approval; displaying information of refusing transaction in the case that the second transaction result is refusing transaction.

Preferably, in the method, after receiving the online response package sent from the client, before executing the completing result to obtain the completing processing result, the method further includes: checking, by the visual financial IC card, whether card issuer authorization data is included in the online response package, if yes, authenticating the card issuer authorization data and keeping on performing completing processing to obtain the completing processing result, otherwise, keeping on performing completing processing to obtain the completing processing result.

Preferably, after Step S4, the method further includes following steps:

Step 3-1, checking, by the visual financial IC card, whether card issuer script is included in the online response package, if yes, executing step 3-2; otherwise, execute Step S5;

Step 3-2, executing, by the visual financial IC card, the issuer script, if executing is successful, executing step 3-3; if executing is error, displaying corresponding error information and executing step 3-3; and Step 3-3, organizing, by the visual financial IC card, the data package according to the second transaction result, the issuer script executing result and the completing processing result, sending the data package obtained by organizing to the client, ending.

Preferably, the method further includes following steps:

Step T1, receiving, by the client, the message sent by the visual financial IC card, determining whether the first transaction result in the message is online request, if yes, executing Step T2, otherwise, displaying information of failed transaction, ending;

Step T2, organizing, by the client, online message according to the message and sending the online message to a server according to the message, receiving a response returned by the server, if the response returned by the server is online response package, sending the online response package to the visual financial IC card, executing Step T3; otherwise, displaying corresponding error information, ending; and Step T3, receiving, by the client, a data package sent by the visual financial IC card, determining whether transaction is approved according to the second transaction result in the data package, if yes, displaying information of successful transaction; otherwise, displaying information of refusing transaction, ending.

Specifically, in Step T3, when the transaction is approved, the method further includes: printing transaction credit.

Further, the method further includes following steps:

Step U1, the server receives online message sent from the client, determines whether the type of online message is correct, if yes, executes Step U2, otherwise, executes Step U4;

Step U2, the server analyzes the online message, if the analyzing is successful, executes Step U3, otherwise, executes Step U4;

Step U3, the server checks and verifies necessary data item in the online message, if the online message includes the necessary data item and the necessary data item is verified successfully, the server organizes online response package, returns the online response package to the client; otherwise, executes Step U4;

Step U4, the server organizes error response package, returns error response package to the client.

According to another aspect of the present invention, the present invention provides a visual financial IC card which includes:

a receiving module configured to receive transaction transferring data and an online response package sent from a client;

an obtaining module configured to obtain transaction data from the transaction transferring data received by the receiving module;

an inputting module configured to receive an online PIN input by a user;

an encrypting module configured to encrypt the received online PIN received by the inputting module to obtain online PIN ciphertext;

a first performing module configured to perform behavior analyzing to obtain a card behavior analyzing result;

a first setting module configured to set a first transaction result according to the card behavior analyzing result obtained by the first performing module;

a first organizing module configured to organize message according to the first transaction result set by the first setting module, the card behavior analyzing result obtained by the first performing module, the transaction data obtained by the obtaining module and the online PIN obtained by the encrypting module;

second performing module configured to perform completing processing according to the online response received by the receiving module to obtain a completing processing result;

a second setting module configured to set a second transaction result according to the completing processing result obtained by the second performing module;

a displaying module configured to display corresponding information according to the second transaction result set by the second setting module;

a second organizing module configured to organize data package according to the second transaction result set by the second setting module and the completing processing result obtained by the second performing module;

a sending module configured to send the message organized by the first organizing module and the data package organized by the second organizing module to the client.

Preferably, the visual financial IC card further includes: a first determining module configured to determine whether the transaction transferring data received by the receiving module is complete; correspondingly, the inputting module specifically is configured to receive an online PIN input by the user in the case that the determining result of the first determining module is complete; the sending module is further configured to return error information to the client in the case that the determining result of the first determining module is not complete;

specifically, the first determining module is configured to determine whether the length of the transaction data in the transaction transferring data received by the receiving module is equal to transaction data length in the transaction transferring data, if yes, the transaction transferring data received by the receiving module is complete; otherwise, the transaction transferring data received by the receiving module is not complete.

Preferably, the visual financial IC card further can include a second determining module configured to determine whether format of the transaction transferring data received by the receiving module is correct; correspondingly, specifically, the inputting module is configured to receive an online PIN input by the user in the case that a determining result of the second determining module is correct;

further, the sending module is configured to return error information to the client in the case that the determining result of the second determining module is not correct.

Further, the second determining module specifically includes:

a determining unit configured to determine whether the transaction amount in the transaction data obtained by the obtaining module matches the transaction type in the transaction data;

a confirming unit configured to confirm the format of the transaction transferring data received by the receiving module is correct in the case that the determining result of the determining unit is matched; confirm the format of the transaction transferring data received by the receiving module is not correct in the case that the determining result of the determining unit is not matched;

Further, the determining unit specifically is configured to determine whether the transaction amount in the transaction data is zero in the case that the transaction type in the transaction data obtained by the obtaining module is consumption, if yes, the transaction amount in the transaction data obtained by the obtaining module does not match the transaction type in the transaction data; otherwise, the transaction amount in the transaction data obtained by the obtaining module matches the transaction type in the transaction data; determine whether the transaction amount in the transaction transferring data is zero in the case that the transaction type in the transaction data obtained by the obtaining module is checking main account balance, if yes, the transaction amount in the transaction data obtained by the obtaining module matches the transaction type in the transaction data; otherwise, the transaction amount in the transaction data obtained by the obtaining module does not match the transaction type in the transaction data.

Preferably, the visual financial IC card further includes a third determining module configured to determine whether a transaction amount is required to be confirmed by the user; correspondingly, further, the displaying module is configured to display the transaction amount in the transaction data obtained by the obtaining module in the case that determining result of the third determining module is that the transaction amount is required to be confirmed by the user; and the inputting module is further configured to receive a transaction amount confirming information input by the user in the case that the determining result of the third determining module is that the transaction amount is required to be confirmed by the user.

Further, the third determining module specifically is configured to determine the transaction type in the transaction data obtained by the obtaining module, if the transaction type is consumption, the user is required to confirm transaction amount; if the transaction type is checking main account balance, the user is not required to confirm the transaction amount.

Preferably, the visual financial IC card further includes: a fourth determining module and a caching module; the caching module is configured to cache the online PIN received by the inputting module; the fourth determining module further comprises:

a first determining unit configured to determine whether the transaction amount in the transaction data obtained by the obtaining module is more that a preset amount;

a second determining unit configured to determine whether a cached online PIN exists in the case that the determining result of the first determining unit is no;

a reading unit configured to read the cached online PIN in the case that the determining result of the second determining unit is no;

an encrypting unit configured to encrypt the online PIN read by the reading unit to obtain online PIN ciphertext;

correspondingly, the inputting module specifically is configured to receive the online PIN input by the user in the case that the determining result of the first determining result is yes or the determining result of the second determining unit is no.

Preferably, the first setting module in the visual financial IC card specifically is configured to check application ciphertext in the card behavior analyzing result obtained by the first performing module, set the first transaction result as an online request if the application ciphertext is authorization request ciphertext; set the first transaction result as refusing transaction if the application ciphertext is application authentication ciphertext.

Further, the visual financial IC card can further include: a refusing module configured to refuse transaction in the case that the first transaction result set by the first setting module is refusing transaction; correspondingly, the displaying module further configured to display information of refusing transaction in the case that the first transaction result set by the first setting module is refusing transaction.

Preferably, the receiving module further is configured to receive an instruction request sent by the client.

Correspondingly, the first organizing module can specifically include:

a first organizing unit configured to organize transaction message according to the first transaction result set by the first setting module, the behavior analyzing result obtained by the first performing module and the transaction data obtained by the obtaining module;

a second organizing unit configured to organize response message according to the online PIN obtained by the encrypting module in the case that the receiving module receives an instruction request;

correspondingly, the sending module specifically is configured to send the transaction message organized by the first organizing unit and the response message organized by the second organizing unit to the client.

Preferably, the second setting module in the visual financial IC card can specifically be configured to check the application ciphertext in the completing processing result obtained by the second performing module; if the application ciphertext is transaction certificate, the second transaction result is set to be approving transaction; if the application ciphertext is application authentication ciphertext, the second transaction result is set to be refusing transaction;

Further, the displaying module can specifically be configured to display information of successful transaction in the case that the second transaction result set by the second setting module is approving transaction; display information of refusing transaction in the case that the second transaction result set by the second setting module is refusing transaction.

Preferably, the visual financial IC card further comprises: a first checking module and an the authenticating module, wherein the first checking module is configured to check whether card issuer authorization data is included in the online response package received by the receiving module; and the authenticating module is configured to authenticate the card issuer authorization data included in the online response package received by the receiving module in the case that the checking result of the first checking module is that the card issuer authorization data is included in the online response package received by the receiving module.

Preferably, the visual financial IC card further includes: the second checking module and the third performing module, wherein the second checking module is configured to check whether card issuer script is included in the online response package received by the receiving module; and the third performing module is configured to perform the issuer script in the online response package received by the receiving module in the case that the second checking module determines that the issuer script is included in the online response package received by the receiving module;

correspondingly, the second organizing module specifically is configured to organize data package according to the second transaction result set by the second setting module, the performing result of the third performing module and the completing processing result obtained by the second performing module; and the displaying module is further configured to display corresponding error information in the case that the performing result of the third performing result is error.

According to another aspect of the present invention, the present invention provides a client which includes:

a first receiving module configured to receive message and data package which are sent by the visual financial IC card;

a first determining module configured to determine whether a first transaction result in the message received by the first receiving module is an online request;

an organizing module configured to organize online message according to the message received by the first receiving module in the case that the determining result of the first determining module is yes;

a first sending module configured to send the online message organized by the organizing module to a server;

a second receiving module configured to receive a response returned by the server;

a second sending module configured to send the online response package to the visual financial IC card in the case that the response received by the second receiving module is online response package;

a second determining module configured to determine whether transaction is approved according to the second transaction result in the data package received by the first receiving module;

a displaying module configured to display information of failed transaction in the case that the determining result of the first determining module is no; display corresponding error information in the case that the response received by the second receiving module is not online response package; display information of successful transaction in the case that the determining result of the second determining module is yes; display information of refusing transaction in the case that the determining result of the second determining module is "No".

Preferably, the client further includes: a printing module configured to print transaction credit in the case that the determining result of the second determining module is yes.

According to another aspect of the present invention, the present invention provides a server, which includes:

a receiving module configured to receive online message sent by a client;

a determining module configured to determine whether the type of the online message received by the receiving module is correct;

an analyzing module configured to analyze the online message received by the receiving module in the case that the determining result of the determining module is yes;

a checking and authenticating module configured to check and authenticate the online message received by the receiving module in the case that analyzing of the analyzing module is successful, if the online message includes necessary data item and authenticating of the necessary data item is successful, checking and authenticating is successful; otherwise, checking and authenticating is not successful;

a first organizing module configured to organize online response package in the case that the checking and authenticating of the checking and authenticating module is successful;

a second organizing module configured to organize error response package in the case that determining result of the determining module is no, the analyzing of the analyzing module is not successful or the checking and authenticating of the checking and authenticating module is not successful; and a sending module configured to send an online response package organized by the first organizing module and the error response package organized by the second organizing module to the client.

The advantage of the present invention is: without help of a transaction terminal such as POS machine, the present invention implements online transaction of financial IC card, which improves security and easiness of the transaction of financial IC card.

BRIEF DESCRIPTION OF ACCOMPANYING DRAWINGS

DETAILED DESCRIPTION OF THE INVENTION

The technical solutions of the embodiments of the disclosure are described clearly and completely in conjunction with the accompanying drawings as follows.

Embodiment 1

Figure 1:
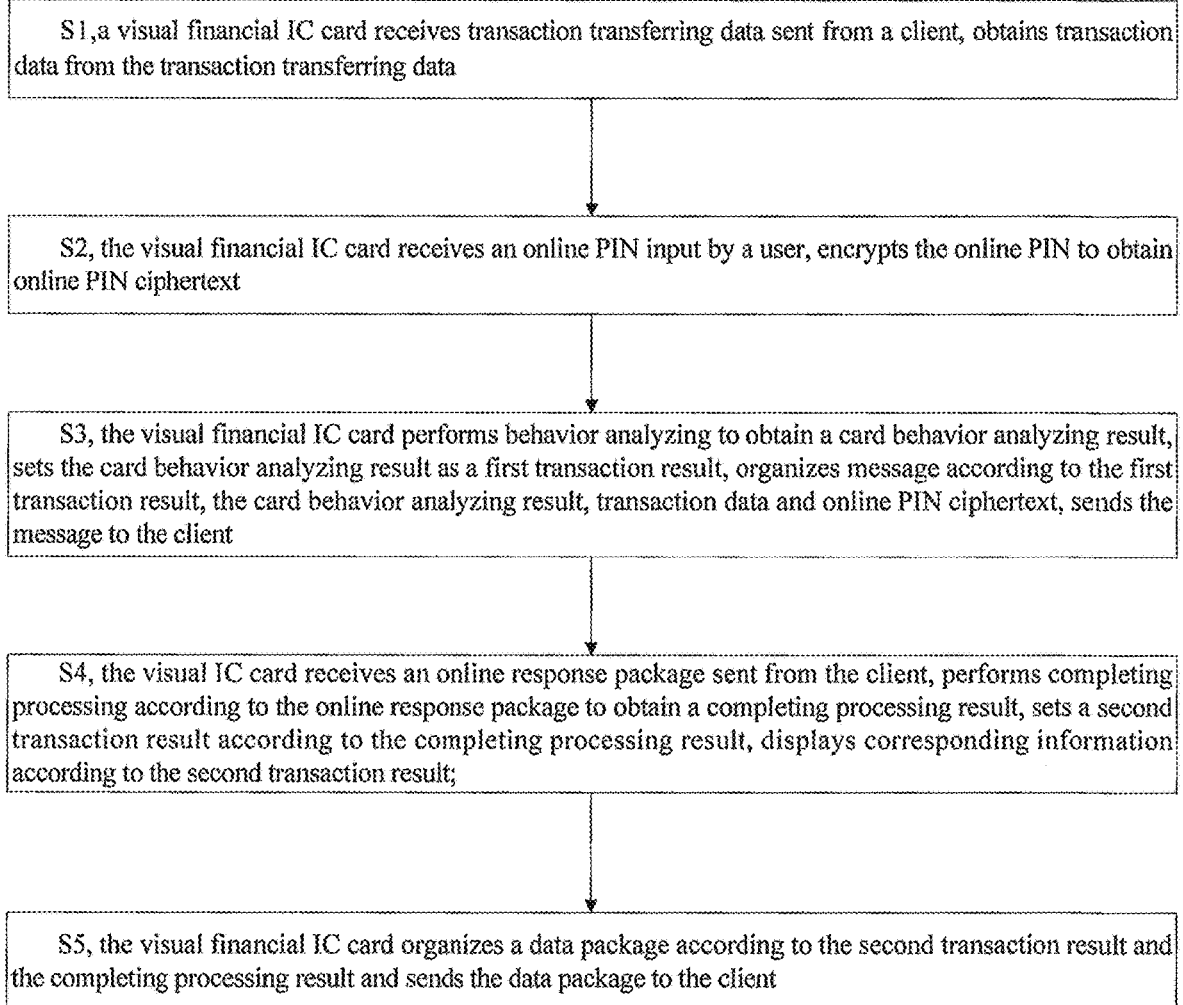
FIG. 1 is a flow chart of online transaction of Embodiment 1 of the present invention.

FIG. 1 shows a flow chart of an online transaction method in the present embodiment. The online transaction method includes following steps:

Step S1, a visual financial IC card receives transaction transferring data sent from a client, obtains transaction data from the transaction transferring data;

Step S2, the visual financial IC card receives an online PIN input by a user, encrypts the online PIN to obtain online PIN ciphertext;

Step S3, the visual financial IC card performs behavior analyzing to obtain a card behavior analyzing result, sets a first transaction result according to the card behavior analyzing result, organizes message according to the first transaction result, the card behavior analyzing result, transaction data and online PIN ciphertext, sends the message to the client;

Step S4, the visual IC card receives an online response package sent from the client, performs completing processing according to the online response package to obtain a completing processing result, sets a second transaction result according to the completing processing result, displays corresponding information according to the second transaction result;

Step S5, the visual financial IC card organizes a data package according to the second transaction result and the completing processing result and sends the data package to the client.

In Embodiment 1, the visual financial IC card can send the message at a time or send the message in parts for several times to the client; preferably, in Step 3, sets a first transaction result according to the card behavior analyzing result, organizes message according to a first transaction result, the card behavior analyzing result, transaction data and online PIN ciphertext, sends the message to the client, which specifically includes:

Step 2-1, the visual financial IC card organizes transaction message according to the first transaction result, the card behavior analyzing result and the transaction data, sends the transaction message to the client;

Step 2-2, the visual financial IC card receives an instruction requirement sent from the client, organizes response message according to the PIN ciphertext, sends the response message to the client.

Further, the online transaction method further includes following steps:

Step T1, the client receives message sent by the visual financial IC card, determines whether the first transaction result in the message is an online request, if yes, executes StepT2, otherwise, displays information of failed transaction, ends process;

Step T2, the client organizes online message according to the message, sends the online message to the server, receives a response returned by the server, if the response returned by the server is the online response package, sends the online response package to the visual financial IC card, executes Step T3; otherwise, display corresponding error information; ends process;

Step T3, the client receives data package sent from the visual financial IC card, determines whether the transaction is approved according to the second transaction result in the data package, if yes, displays information of successful transaction, ending; otherwise, displays information of refusing transaction, ends process.

In this case, in Step T3, when the transaction is approved, the method further includes printing transaction credit.

Further, the online transaction method further includes following steps:

Step U1, the server receives online message sent from the client, determines whether type of online message is correct, if yes, executes Step U2, otherwise, executes Step U4;

Step U2, the server analyzes the online message, if the analyzing is successful, executes Step U3, otherwise, executes Step U4;

Step U3, the server checks and verifies necessary data item in the online message, if the online message includes necessary data item and the necessary data item is verified successfully, the server organizes online response package and returns the online response package to the client, otherwise, executes step U4;

Step U4, the server organizes error response package, returns error response package to the client.

Embodiment 2

Figure 2:
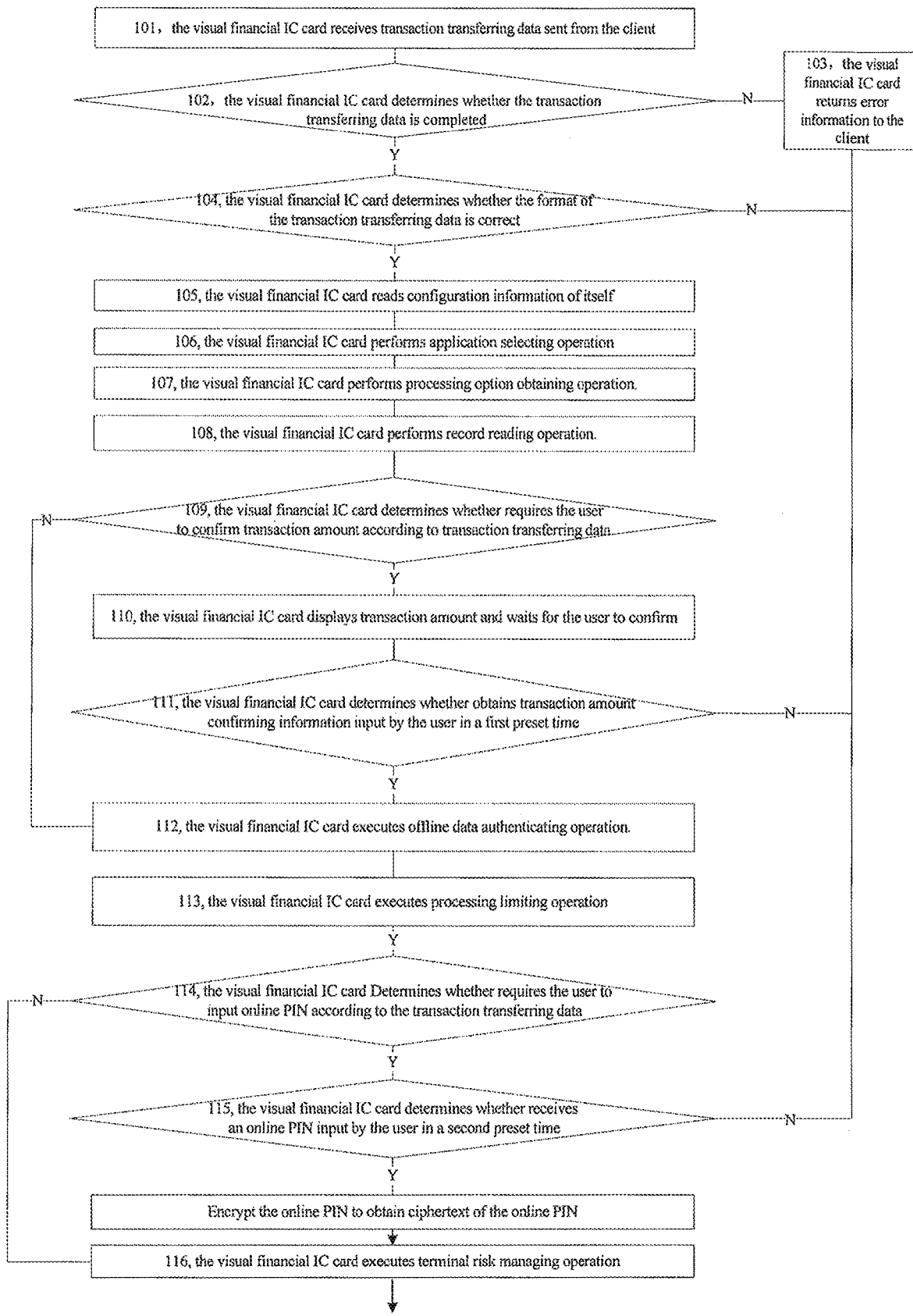
FIG. 2 and FIG. 3 show a flow chart of a working method of a visual financial IC card of Embodiment 2 of the present invention.
Figure 3:
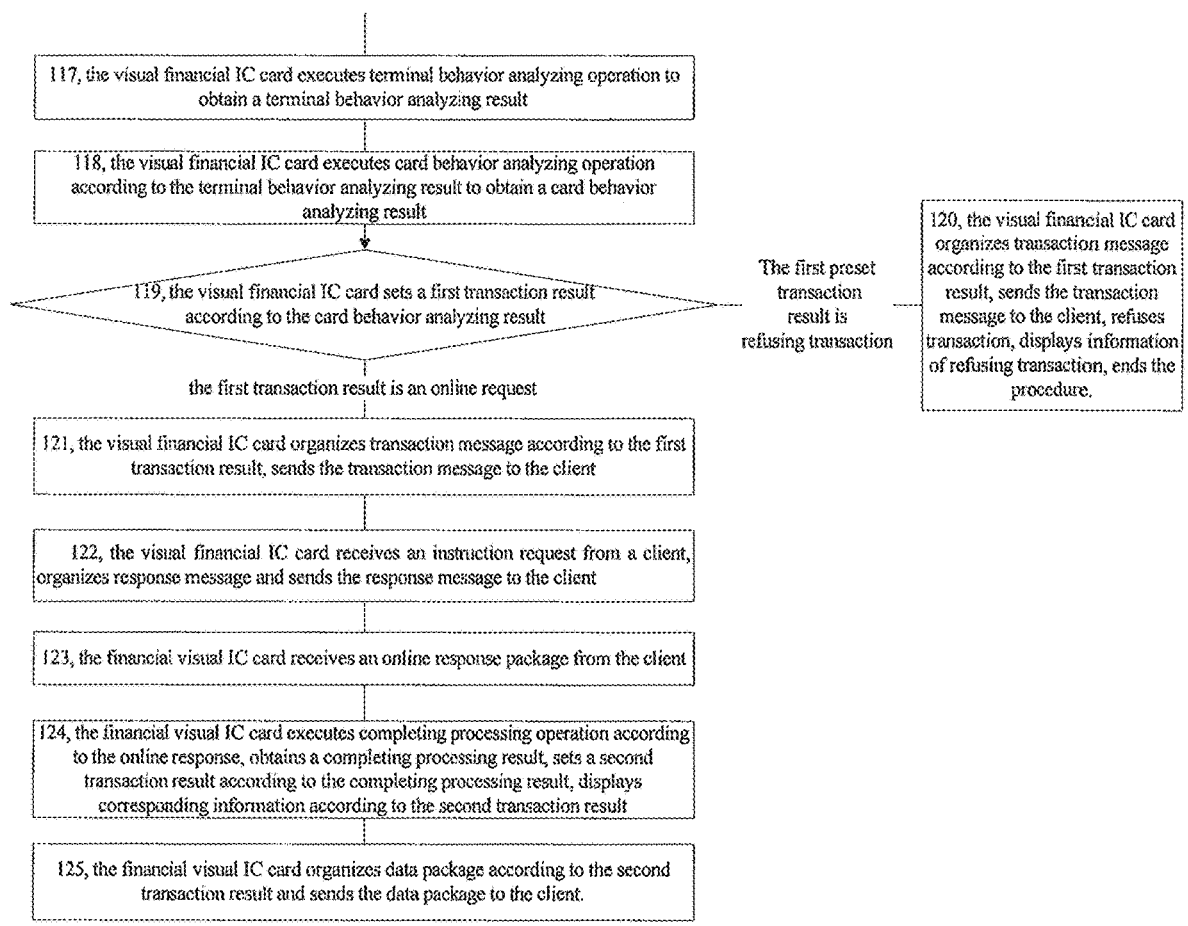

As shown in FIG. 2 and FIG. 3, a working flow of a working method for visual financial IC card is provided in Embodiment 2. The method is applied in a system of visual financial IC card, a client and a server and the client is an application installed in a terminal device. The method further includes following steps:

Step 101, the visual financial IC card receives transaction transferring data sent from the client;

Specifically, the visual financial IC card receives the transaction transferring data sent from the client, obtains transaction amount, transaction date, transaction time and transaction type from the transaction transferring data, and stores the transaction amount, transaction date, transaction time and transaction type.

In Embodiment 2, the transaction transferring data includes APDU instruction and transaction data; in this case, the APDU instruction includes transaction type and transaction data length; the transaction data includes transaction amount, transaction date and transaction time. For example, the visual financial IC card receives the transaction transferring data sent from the client, i.e. "0x7e0x410x000x000x0c0x000x000x000x010x230x000x160x030x220x170x100x22", obtains the first five bytes of the transaction transferring data, i.e. "0x7e0x410x000x000x0c", as the APDU instruction, obtains the second bytes, i.e. "0x41", of the APDU instruction as the transaction type, which represents the transaction type is consuming; obtains the sixth to eleventh bytes of the transaction transferring data, i.e. "0x000x000x000x010x230x00", as the transaction amount, which represents that the transaction amount is RMB123.00, obtains the twelfth to seventeenth byte of the transaction transferring data, i.e. "0x160x030x220x170x100x22", as transaction date and transaction time, which represents 10 minutes and 22 second past 17 on Mar. 22, 2016.

Step 102, the visual financial IC card determines whether the transaction transferring data is completed, if yes, executes Step 104, otherwise, executes Step 103.

Specifically, the visual financial IC card can determine whether the length of the transaction data in the transaction transferring data equals the transaction data length included in the APDU instruction in the transaction transferring data, if yes, the transaction transferring data is determined to be complete; otherwise, the transaction transferring data is determined to be not complete.

For example, "0x7e0x410x000x000x0c0x000x000x000x010x 230x000x160x030x220x170x100x22" is transaction transferring data received by the visual financial IC card from the client, the first five bytes, i.e. "0x7e0x 410x000x000x0c", of the transaction transferring data is obtained as APDU instruction, the fifth byte, i.e. "0x0c", of the APDU instruction is obtained as transaction data length, which is equivalent to decimal number 12; the data in the transaction transferring data except for the APDU instruction, i.e. "0x000x000x000x010x230x000x160x030x220x 170x100x22", is obtained as transaction data, if the length of the transaction data is 12 bytes, the visual financial IC card determines that the transaction transferring data is complete, otherwise, the visual financial IC card determines that the transaction transferring data is not complete.

Step 103, the visual financial IC card returns error information to the client, ending the procedure.

Step 104, the visual financial IC card determines whether the format of the transaction transferring data is correct, if yes, executes Step 105; otherwise, goes back to Step 103.

Specifically, the visual financial IC card can determine whether the transaction amount in the transaction transferring data matches the transaction type, if yes, the format of the transaction transferring data is correct; otherwise, the format of the transaction transferring data is not correct.

In Embodiment 2, when the transaction type is a first preset value, the transaction type represents consumption; when the transaction type is a second preset value, the transaction type represents checking main account balance, when the transaction type is a third preset value, the transaction type represents electronic cash credit for load. For example, the first preset value is "0x41", the second preset value is "0x42", the third preset value is "0x40".

Correspondingly, when the transaction type is the first preset value and the third preset value, the visual financial IC card determines whether the transaction amount is zero, if yes, the format of the transaction transferring data is determined to be incorrect; otherwise, the format of the transaction transferring data is correct; when the transaction type is the second preset value, the visual financial IC card determines whether the transaction amount is zero, if yes, the format of the transaction transferring data is determined to be correct; otherwise, the format of the transaction transferring data is incorrect.

For example, "0x7e0x410x000x000x0c0x000x000x000x 010x 230x000x160x030x220x170x100x22" is transaction transferring data received by the visual financial IC card from the client, the second byte, i.e. 0x41, in the transaction transferring data is obtained as transaction type representing that the transaction type is consumption; the data from the sixth byte to the eleventh byte, i.e. "0x000x 000x000x010x230x00", in the transaction transferring data is obtained as transaction amount representing that the transaction amount is 123.00RMB, then the visual financial IC card confirms that the format of transaction transferring data is correct.

Step 105, the visual financial IC card reads configuration information of itself.

In Embodiment 2, the configuration information of the visual financial IC card can specifically includes: an interface device sequence number, terminal country code, terminal capability and terminal type, transaction currency code, etc.

Further, Step 105 can include checking a card type;

In Embodiment 2, the card type detected by the visual financial IC card is contact card.

Step 106, the visual financial IC card performs application selecting operation.

Specifically, the visual financial IC card selects an application supported by the visual financial IC card itself from an application selecting list.

Step 107, the visual financial IC card performs processing option obtaining operation.

Specifically, the visual financial IC card obtains AIP (Application Interchange Profile) and AFL (Application File Locator).

Step 108, the visual financial IC card performs record reading operation.

Specifically, the visual financial IC card reads application data required by the transaction according to AFL.

In Embodiment 2, the application data required by the transaction includes: a card holder verification method list, CA public key index, public key certificate of card issuer, application version, country code of card issuer, effective date of application, expire date of application, controlling of application usage, application PAN, application PAN sequence number and second, equivalent magnetic track, etc.

Step 109, the visual financial IC card determines whether requires the user to confirm transaction amount according to transaction transferring data, if yes, executes Step 110; otherwise, executes Step 112.

Specifically, the visual financial IC card determines whether to display the transaction amount according to transaction type, if yes, executes Step 110; otherwise, executes Step 112.

Specifically, the visual financial IC card determines the transaction type, if the transaction type is consuming or electronic cash credit for load, the user is required to confirm transaction amount; if the transaction type is checking main account balance, the user is not required to confirm transaction amount.

In Embodiment 2, if the transaction type in the transaction transferring data is a first preset value, the transaction type is consumption; if the transaction type in the transaction transferring data is a second preset value, the transaction type is checking main account balance; if the transaction type in the transaction transferring data is a third preset value, the transaction type is electronic cash credit for load. For example, the first preset value is "0x41", the second preset value is"0x42", the third preset value is "0x40".

Step 110, the visual financial IC card displays transaction amount and waits for the user to confirm.

For example, when the transaction amount is "0x000x 000x000x010x230x00", the visual financial IC card displays "123.00RMB".

Step 111, the visual financial IC card determines whether obtains transaction amount confirming information input by the user in a first preset time, if yes, executes Step 112; otherwise, goes back to Step 103.

Specifically, the visual financial IC card can determine whether a first preset key is triggered in a first preset time, if yes, the visual financial IC card determines receiving transaction amount confirming information input by the user in the first preset time, otherwise, the visual financial IC card determines not receiving transaction amount confirming information input by the user in the first preset time.

In this case, the first key is confirming key.

Step 112, the visual financial IC card executes offline data authenticating operation.

In embodiment 2, the offline data authentication can be SDA (static data authentication)) or DDA (dynamic data authentication).

Step 113, the visual financial IC card executes processing limiting operation.

Step 114, the visual financial IC card determines whether requires the user to input online PIN according to the transaction transferring data, if yes, executes Step 115; otherwise, executes Step 116.

Specifically, the visual financial IC card determines whether the transaction amount in the transaction transferring data is more than a preset amount, if yes, the user is required to input online PIN, if the transaction amount is less than or equal to the preset amount, then further determines whether there is cached online PIN in itself, if yes, the user is not required to input online PIN, if no, the user is required to input online PIN.

Step 115, the visual financial IC card determines whether receives an online PIN input by the user in a second preset time, if yes, encrypts the online PIN to obtain ciphertext of the online PIN, executes Step 116; otherwise, goes back to Step 103.

Step 116, the visual financial IC card executes terminal risk managing operation.

Step 117, the visual financial IC card executes terminal behavior analyzing operation to obtain a terminal behavior analyzing result.

In this case, the terminal behavior analyzing result can be requiring online operation or requiring refusing transaction.

Step 118, the visual financial IC card executes card behavior analyzing operation according to the terminal behavior analyzing result to obtain a card behavior analyzing result.

In Embodiment 2, the card behavior analyzing result can include: ciphertext information data, application ciphertext, application transaction counter and card issuer application data; in this case, the application ciphertext can be Authorization Request Cryptogram, hereinafter referred to as ARQC, which is for indicating online authentication request; the application ciphertext can be Application Authentication Cryptogram, hereinafter referred to as AAC, which is for indicating refusing transaction.

Step 119, the visual financial IC card sets a first transaction result according to the card behavior analyzing result, if the first preset transaction result is refusing transaction, executes Step 120, if the first transaction result is an online request, executes Step 121.

Specifically, if the application ciphertext in the card behavior analyzing result is ARQC, the visual financial IC card sets the first transaction result as online request; if the application ciphertext in the card behavior analyzing result is AAC, the visual financial IC card sets the first transaction result as refusing transaction.

For example, if the application ciphertext in the card behavior analyzing result is ARQC, the visual financial IC card sets the first transaction result as "0x02"; if the application ciphertext in the card behavior analyzing result is AAC, the visual financial IC card sets the first transaction result as "0x01".

Step 120, the visual financial IC card organizes transaction message according to the first transaction result, sends the transaction message to the client, refuses transaction, displays information of refusing transaction, ends the procedure.

Step 121, the visual financial IC card organizes transaction message according to the first transaction result, sends the transaction message to the client, executes Step 122;

In Embodiment 2, the transaction message can include the first transaction result, the transaction amount, the transaction date, a cardholder verifying result, the interface device sequence number and the card issuer application data, the first transaction result can be refusing transaction or the online request.

Further, the transaction message can include one or some of following items: the application ciphertext, ciphertext information data, an unpredictable number, the application transaction counter, a terminal verifying result, transaction type, the transaction currency code, application interaction feature, terminal country code, other amount, terminal capacity, special file name, an application version, a transaction sequence counter. For example, according to the first transaction result "0x02", the terminal verifying result "0x950x050x080x800x000x000x00", the transaction date "0x9a0x030x160x03 0x22", the unpredictable number "0x9f0x370x040x730x550x820xec", the application transaction counter "0x9f0x360x020x000x24", the ciphertext information data "0x9f0x270x010x80", the application ciphertext "0x9f0x260x080x330x370x6f0xbd0x790x960x 650xe5", the card issuer application data"0x9f0x 100x130x070x010x010x030xa40xb80x040x010x0a 0x 010 x000x000x200x000x000xb10x910xcc0xd2", the cardholder verifying result"0x9f0x340x030x010x000x02", transaction sequence counter "0x9f0x410x040x000x000x000x01", the special file name "0x840x070xa00x000x000x 030x330 x010x01", the application version number "0x9f0x090x 020x000x8c", the transaction type "0x9c0x010x00", the transaction currency code "0x5f0x2a0x020x010x56", the terminal country code "0x9f0x1a0x020x010x56", other amount "0x9f0x030x060x000x000x000x000x000x00", the terminal capacity "0x9f0x330x030xa00xc80xc8", the terminal type "0x9f0x350x010x34", the interface device sequence number "0x9f0x1e0x080x000x000x000x000x 000x 000x000x00" and the transaction amount "0x9f 0x020x060x000x000x000x010x230x00", the visual financial IC card organizes following transaction message:

"0x020x950x050x080x800x000x000x9a0x030x 160x030x220x9f0x370x040x730x550    x820xec0x820x0 20x7c0x000x9f0x360x020x000x240x9f0x270x010x800x 9f0x260x080x330x370x6f0xbd0x790x960x650xe50x9f0 x100x130x070x010x010x030xa40xb80x040x010x0a0x 010x0 00x000x200x000x000xb10x910xcc0xd20x9f0x340x 030x010x000x020x9f0x410x040x000x000x000x010x840
x070xa00x000x000x030x330x010x010x9f0x090x020x000
x8c0x9c0x010x000x5f 0x2a0x020x010x560x9f0x1a0x020
x010x560x9f0x030x060x000x000x000x000x000x000x9f0
x330x030xa00xc80xc80x9f0x350x010x340x9f0x1e0x080-
x000x000x000x000x000x000x000x000x9f0x020x060x00-
0x000x000x010x230x000x900x00", in which the last two bytes "0x900x00" are successful state code.

Step 122, the visual financial IC card receives an instruction request from a client, organizes response message and sends the response message to the client.

In this case, the response message includes application PAN, application PAN sequence number, second equivalent magnetic track data, ciphertext of online PIN and a code indicating input way of service point; in Embodiment 2, the code indicating input way of service point is a fixed value, for example, according to application PAN "0x5a0x 080x620x280x000x010x000x000x110x17", application PAN sequence number"0x5f0x340x010x01", second equivalent magnetic track data"0x570x110x620x 280x000x010x000x000x110x170xd30x010x220x010x010 x230x450x670 x89", ciphertext of online PIN "0x990x 080xa40x010x580xf10xb40x710x3e0xc2" and a code indicating input way of service point "0xff0x040x020x050x10", the visual financial IC card organizes a response message:
"0x5a0x080x620x280x000x010x000x000x110x170x5f0
x340x010x010x570x110x620x280x000x010x000x000
x110x170xd30x010x220x010x010x230x450x670x890x
990x080xa40x010x5 80xf10xb40x710x3e0xc20xff0x040x
020x050x100x900x00".

Step 123, the visual financial IC card receives an online response package from the client.

In this case, the online response package can include an online result and an authorization response code, the online response package can further include card issuer script and card issuer authorization data.

For example, the online response package can be "0x000x8a0x020x300x30", in which "0x00" is an online result representing normal online and "0x8a0x020x300x30" is the authorization response code.

Step 124, the visual financial IC card executes completing processing operation according to the online response package, obtains a completing processing result, sets a second transaction result according to the completing processing result, displays corresponding information according to the second transaction result.

In Embodiment 2, the completing processing result can include: ciphertext information data, application ciphertext, application transaction counter and card issuer application data; in this case, the application ciphertext can be Transaction Certificate, hereinafter referred to as TC, or AAC.

When the application ciphertext in the completing processing result is TC, the second transaction result is set to be approving transaction; when the application ciphertext in the completing processing result is AAC, the second transaction result is set to be refusing transaction;

when the second transaction result is approving transaction, the visual financial IC card displays information of successful transaction; when the second transaction result is refusing transaction, the visual financial IC card displays information of refusing transaction.

It should be noted that, when the online response package received from the client by the visual financial IC card includes card issuer script, after Step 124, the method further includes that the financial IC card executes card issuer script, displays corresponding error message in the case that executing is error; when the online response package received from the client by the visual financial IC card includes card issuer authorization data, before step 124, the method further includes that the visual financial IC card verifies the card issuer authorization data.

Step 125, the visual financial IC card organizes data package according to the second transaction result and sends the data package to the client.

In this case, the data package can include the second transaction result, a terminal verification result (TVR), an application transaction counter (ATC), ciphertext information data (CID), application ciphertext (AC) and card issuer application data; the data package can further include a result of executing card issuer script. For example, according to the second transaction result "0x00", TVR"0x950x 050x080x800x000x800x00", ATC"0x9f0x360x020x00 0x3c", CID"0x9f0x270x010x40", AC "0x9f0x260x080x3f 0xd40x5d0x670x430x080x9b0x32" and card issuer application data"0x9f0x100x080x070x010x010x030x640xbc0x 040x01", the visual financial IC card organizes data package as the following:
"0x000x950x050x080x800x000x800x000x9f0x360x02
0x000x3c0x9f0x270x010x400x9f0x260x080x3f0xd40x5d
0x670x430x080x9b0x320x9f0x100x080x070x010x010x0
30x640xbc0x04 0x01", in which the first byte"0x00" is the second transaction result, representing approving transaction.

The visual financial IC card in Embodiment 2 interacts with the client to complete transaction and verifies information from the client, which can improve security and convenience of the financial IC card.

Figure 4:
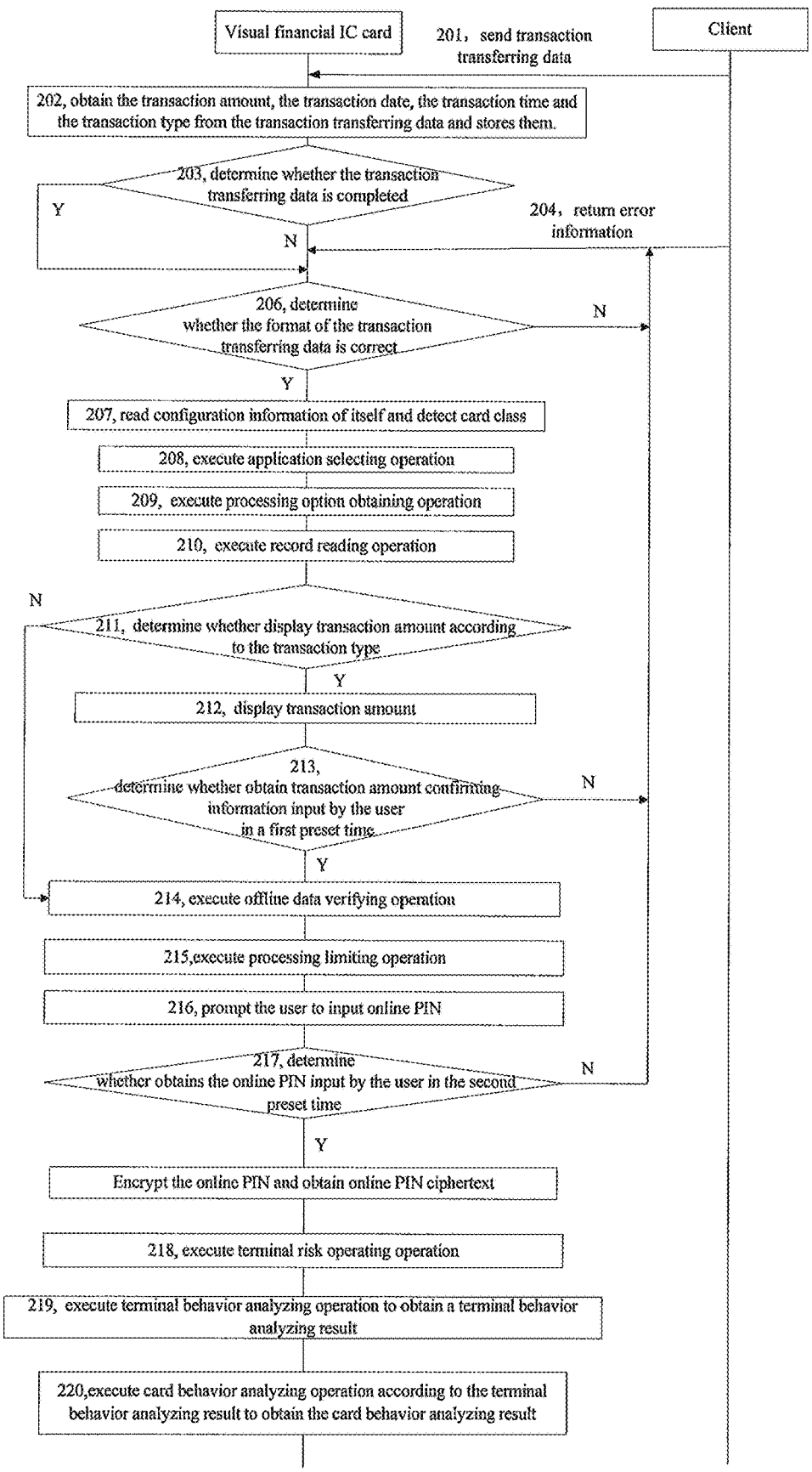
FIG. 4, FIG. 5 and FIG. 6 show a flow chart of online transaction of Embodiment 2 of the present invention.
Figure 5:
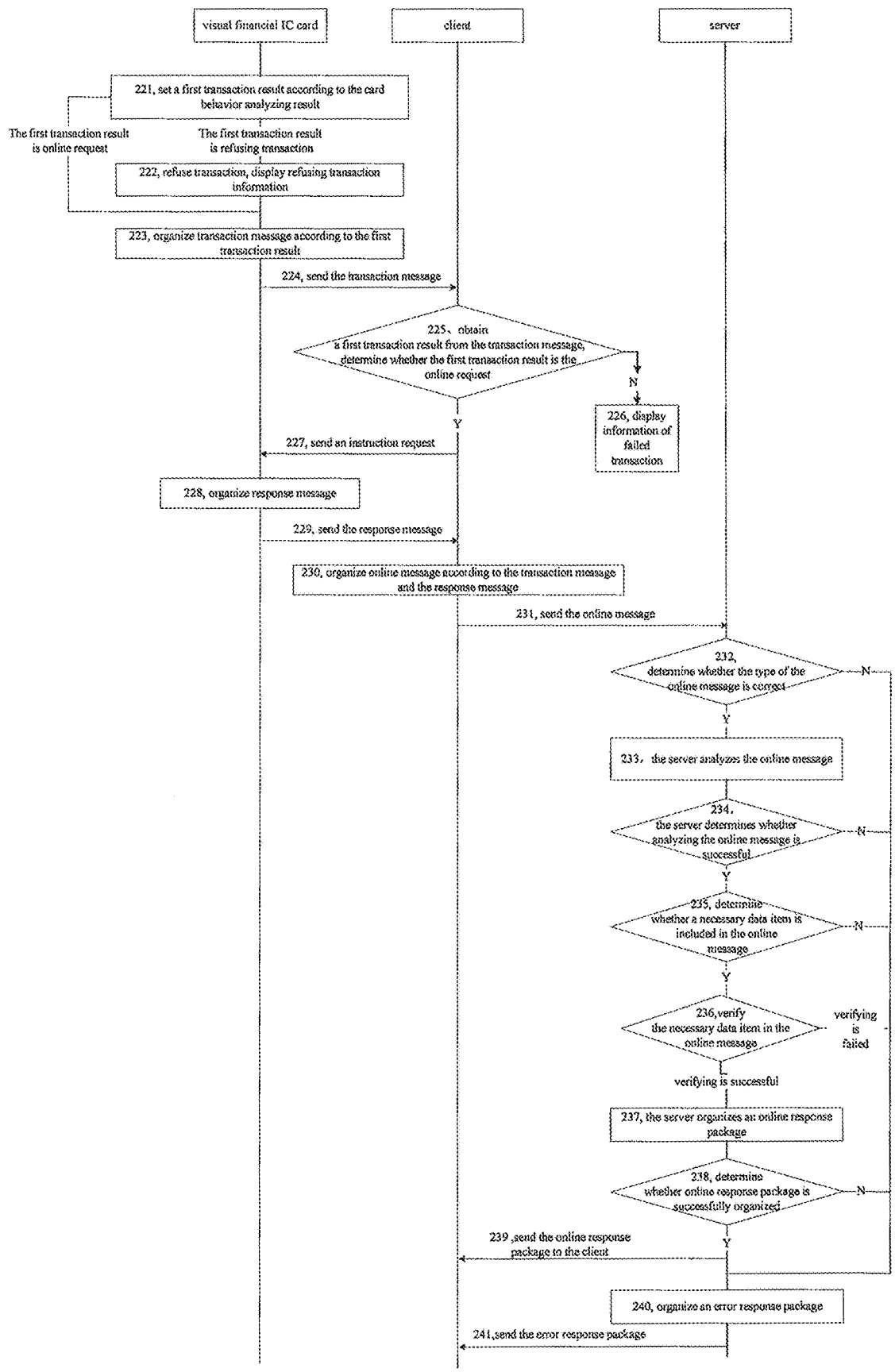
Figure 6:
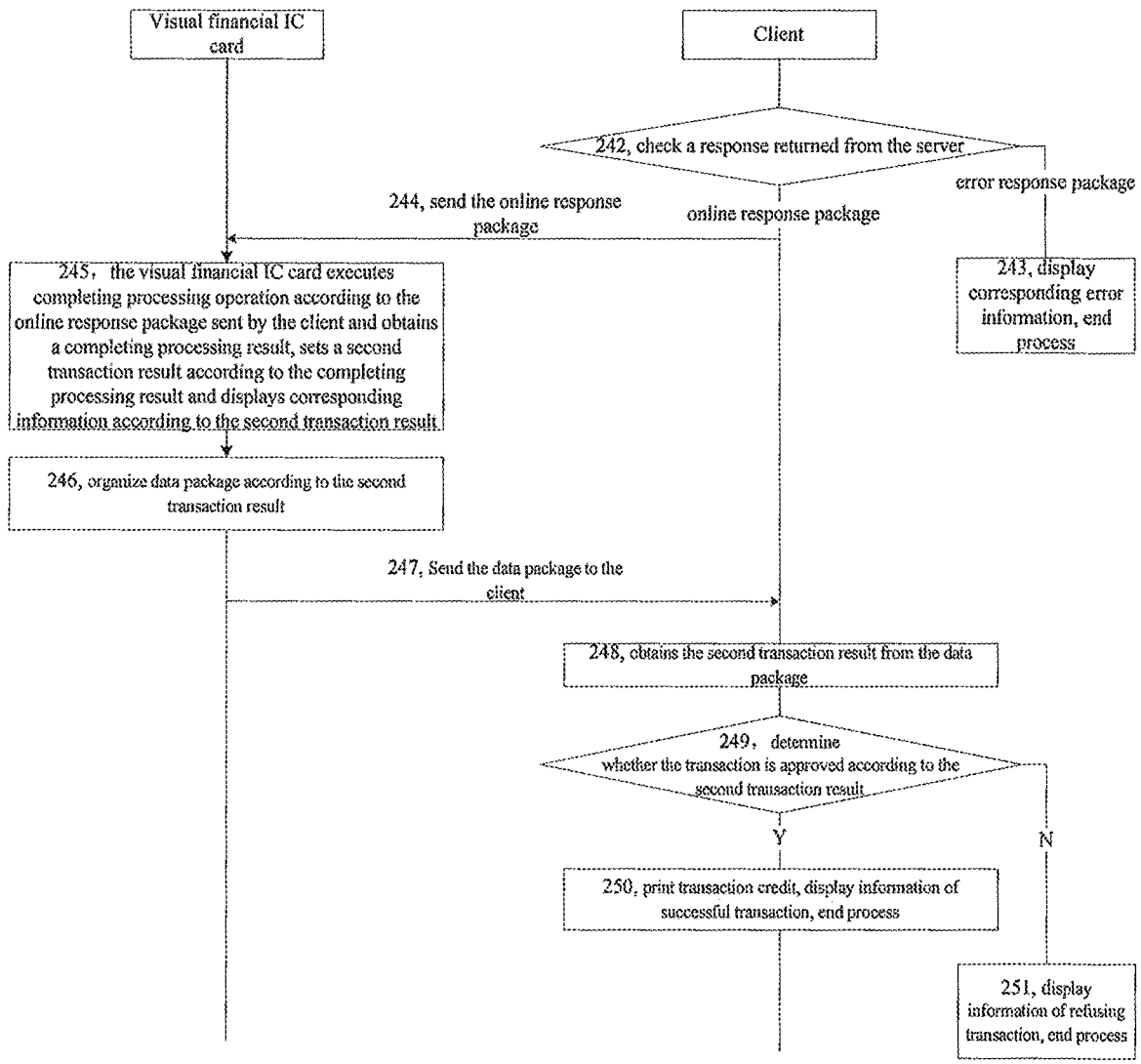

According to the above working method of the visual financial IC card, Embodiment 2 of the present invention further provides an online transaction process. As shown in FIG. 4, FIG. 5 and FIG. 6, the process includes following steps:

Step 201, the client sends transaction transferring data to the visual financial IC card.

The transaction transferring data can include transaction amount, transaction date, transaction time and transaction type.

In Embodiment 2, the transaction transferring data includes APDU instruction and transaction data, of which the APDU instruction includes transaction type and transaction data length and the transaction data includes the transaction amount, the transaction date and the transaction time.

For example, "0x7e0x410x000x000x0c0x000x000x000x 010x230x000x160x030x220x170x100x22" is transaction transferring data received from the client by the visual financial IC card. "0x7e0x410x000x000x0c" is the APDU instruction, the second byte of the instruction "0x41" is transaction type representing that the transaction type is consumption;

"0x000x000x000x010x230x00" is transaction amount representing that the transaction amount is RMB123.00; "0x160x030x220x170x100x22" is transaction date and transaction time, which representing 10 minutes 22 seconds past 17 on March 22, year 2016.

Step 202, the visual financial IC card obtains the transaction amount, the transaction date, the transaction time and the transaction type from the transaction transferring data and stores them.

Step 203, the visual financial IC card determines whether the transaction transferring data is complete, if yes, executes Step 206; otherwise, executes Step 204.

Specifically, the visual financial IC card can determine whether the length of the transaction data in the transaction transferring data equals the transaction data length included in the APDU instruction in the transaction transferring data, if yes, the visual financial IC card determines the transaction transferring data to be complete; otherwise, the visual financial IC card determines the transaction transferring data to be incomplete.

For example, "0x7e0x410x000x000x0c0x000x000x000x 010x 230x000x160x030x220x170x100x22" is transaction transferring data received from the client by the visual financial IC card. "0x7e0x410x000x000x0c" is the APDU instruction, the fifth byte "0x0c" of the instruction is transaction data length which is equal to binary data 12; 0x000x000x000x010x230x000x160x030x220x170x100x22" is transaction data, if the length of the transaction data is 12 bytes, the visual financial IC card determines that the transaction transferring data is complete; otherwise the visual financial IC card determines that the transaction transferring data is incomplete.

Step 204, the visual financial IC card returns error information to the client.

Step 205, the client displays error information and ends process.

Step 206, the visual financial IC card determines whether the format of the transaction transferring data is correct, if yes, executes Step 207; otherwise, goes back to Step 204.

Specifically, the visual financial IC card can determine whether the transaction amount in the transaction transferring data matches the transaction type, if yes, the format of the transaction transferring data is correct; otherwise, the format of the transaction transferring data is not correct.

In Embodiment 2, when the transaction type is a first preset value, the transaction type represents consumption; when the transaction type is a second preset value, the transaction type represents checking main account balance. For example, the first preset value is "0x41", the second preset value is "0x42".

Correspondingly, when the transaction type is the first preset value, the visual financial IC card determines whether the transaction amount is zero, if yes, the format of the transaction transferring data is determined to be incorrect; otherwise, the transaction transferring data is determined to be correct; when the transaction type is the second preset value, the visual financial IC card determines whether the transaction amount is zero, if yes, the format of the transaction transferring data is determined to be correct; otherwise, the format of the transaction transferring data is determined to be incorrect.

For example, "0x7e0x410x000x000x0c0x000x000x000x 010x 230x000x160x030x220x170x100x22" is transaction transferring data received from the client by the visual financial IC card. In this case, "0x41" is transaction type presenting consumption; the transaction amount is "0x000x000x000x010x230x00" representing that the transaction amount is RMB123, the visual financial IC card determines that the format of the transaction transferring data is correct.

Step 207, the visual financial IC card reads configuration information of itself and detects card type.

Step 207 further includes detecting card type.

In Embodiment 2, the visual financial IC card detects that the card type is contact card.

Step 208, the visual financial IC card executes application selecting operation.

Specifically, the visual financial IC card selects an application supported by the visual financial IC card from a application candidate list.

Step 209, the visual financial IC card executes processing option obtaining operation.

Specifically, the visual financial IC card obtains Application Interchange Profile (AIP) and Application File Locator (AFL).

Step 210, the visual financial IC card executes record reading operation.

Specifically, the visual financial IC card reads application data required by transaction according to the AFL.

Step 211, the visual financial IC card determines whether display transaction amount according to the transaction type, if yes, executes Step 212; otherwise, executes Step 214.

Specifically, the visual financial IC card determines the transaction type, if the transaction type is the first preset value, the visual financial IC card determines to display the transaction amount; if the transaction type is the second preset value, the visual financial IC card determines not to display the transaction amount.

In Embodiment 2, when the transaction type is the first preset value, it represents that the transaction type is consumption; when the transaction type is the second preset value, it represents that the transaction type is checking main account balance. For example, the first preset value is "0x41"; the second preset value is "0x42".

Step 212, the visual financial IC card displays transaction amount.

For example, when the transaction amount is "0x000x000x000x010x230x00", the visual financial IC card displays "RMB123.00".

Step 213, the visual financial IC card determines whether obtains transaction amount confirming information input by the user in a first preset time, if yes, executes Step 214; otherwise, goes back to Step 204.

Specifically, the visual financial IC card can determine whether its first pressing key is triggered in the first preset time, if yes, the visual financial IC card determines that the transaction amount confirming information input by the user is obtained in the first preset time; otherwise, the visual financial IC card determines that the transaction amount confirming information input by the user is not obtained in the first preset time.

In this case, the first pressing key may be a confirming key.

Step 214, the visual financial IC card executes offline data verifying operation.

Step 215, the visual financial IC card executes processing limiting operation.

Step 216, the visual financial IC card prompts the user to input online PIN.

Further, before Step 216, the method further includes that the visual financial IC card determines whether requires the user to input online PIN according to the transaction transferring data, if yes, executes Step 216; otherwise, executes Step 218;

Specifically, the visual financial IC card determines whether the transaction amount in the transaction transferring data is more than a preset amount, if the transaction amount in the transaction transferring data is more than a preset amount, it requires the user to input the online PIN; if the transaction amount in the transaction transferring data is less than or equal to a preset amount, the visual financial IC card further determines whether a cached online PIN exists, if yes, it does not require the user to input the online PIN; if no, it requires the user to input the online PIN.

Step 217, the visual financial IC card determines whether obtains the online PIN input by the user in the second preset time, if yes, encrypt the online PIN to obtain the ciphertext of the online PIN, goes to Step 218; otherwise, goes back to Step 204.

Step 218, the visual financial IC card executes terminal risk operating operation.

Step 219, the visual financial IC card executes terminal behavior analyzing operation to obtain a terminal behavior analyzing result.

In this case, the terminal behavior analyzing result can be requiring online or requiring refusing transaction.

Step 220, the visual financial IC card executes card behavior analyzing operation according to the terminal behavior analyzing result to obtain the card behavior analyzing result.

In Embodiment 2, the card behavior analyzing result can include ciphertext information data, application ciphertext, application transaction counter and card issuer application data; in this case, the application ciphertext can be Authorization Request Cryptogram (ARQC) for indicating online authorization request; the application ciphertext can be Application Authentication Cryptogram (AAC) for indicating refusing transaction.

Step 221, the visual financial IC card sets a first transaction result according to the card behavior analyzing result, if the first transaction result is refusing transaction, executes Step 222; if the first transaction result is online request, executes Step 223.

Specifically, when the application ciphertext in the card behavior analyzing result is ARQC, the visual financial IC card sets the first transaction result as online request; when the application ciphertext in the card behavior analyzing result is AAC, the visual financial IC card sets the first transaction result as refusing transaction.

For example, when the application ciphertext in the card behavior analyzing result is ARQC, the visual financial IC card sets the first transaction result as "0x02"; when the application ciphertext in the card behavior analyzing result is AAC, the visual financial IC card sets the first transaction result as "0x01".

Step 222, the visual financial IC card refuses transaction, displays refusing transaction information, executes Step 223;

Step 223, the visual financial IC card organizes transaction message according to the first transaction result.

In this case, the transaction message can include a first transaction result, transaction amount, transaction date, card holder verifying method result, interface device sequence number and card issuer application data; the first transaction result can be refusing transaction or requesting online.

Further, the transaction message can include one or more of following items: application ciphertext, ciphertext information data, an unpredictable number, an application transaction counter, a terminal verifying result, transaction type, transaction currency code, application interaction character, terminal country code, other amount, terminal capability, terminal type, special file name, application version number, transaction sequence counter. For example, according to the first transaction result "0x02", the terminal verifying result "0x950x050x080x800x000x000x00", the transaction date"0x9a0x030x160x03 0x22", the unpredictable number "0x9f0x370x040x730x550x820xec", the application transaction counter "0x9f0x360x020x000x24", the ciphertext information data "0x9Mx270x010x80", the application ciphertext "0x9f0x260x080x330x370x6f0xbd0x790x960x650xe5", the card issuer application data "0x9f0x100x130x070x010x010x030xa40xb80x040x010x0a 0x010x000x000x200x000x000xb10x910xcc0xd2", the card holder verifying method result "0x9f0x340x030x010x000x02", the transaction sequence counter "0x9f0x410x040x000x000x000x01", the special file name "0x840x070xa00x000x000x030x330x010x01", the application version number "0x9f0x090x020x000x8c", the transaction type "0x9c0x010x00", the transaction currency code "0x5f0x2a0x020x010x56", the terminal country code "0x9f0x1a0x020x010x56", other amount "0x9f0x030x060x000x000x000x000x000x00", the terminal capability "0x9f0x330x030xa00xc80xc8", the terminal type"0x9f0x350x010x34", the interface device sequence number "0x9f0x1e0x080x000x000x000x000x000x000x000x00" and the transaction amount "0x9f 0x020x060x000x000x000x010x230x00", the visual financial IC card organizes following transaction message:

"0x020x950x050x080x800x000x000x000x9a0x030x160x030x220x9f0x370x040x730x550 x820xec0x820x 020 x7c0x000x9f0x360x020x000x240x9f0x270x010x800x9f0 x260x080x330x37 0x6f0xbd0x790x960x650xe50x 9f0x 100x 130x070x010x010x030xa40xb80x040x010x0a0x 010x0 00x000x200x000x000xb10x910xcc0xd20x9f0x340x 030x010x000x020x9f0x410x040x000x000 x000x010x 840x070xa00x000x000x030x330x010x010x9f0x090x020 x000x8c0x9c0x010x000x5f 0x2a0x020x010x560x9f0x1a 0x 020x010x560x9f0x030x060x000x000x000x000x000x 000x9f0x330x030xa00xc80xc80x9f0x350x010x340x9f0x 1e0x080x000x000x000x000x000x000x000x000x9f0x020 x060x000x000x000x010x230x000x900x00", in which the last two bytes "0x900x00" represent successful state code.

Step 224, the visual financial IC card sends the transaction message to the client.

Step 225, the client obtains a first transaction result from the transaction message, determines whether the first transaction result is the online request, if yes, executes Step 227; otherwise, executes Step 226.

Specifically, the client can determine a value of the first transaction result, if the first transaction result is a fifth preset value, the first transaction result is the online request; otherwise, the first transaction result is not the online request.

For example, the fifth preset value is "0x02", the transaction message returned by the visual financial IC card is: "0x020x950x050x080x800x000x000x000x9a0x030x160x 030x220x9f0x370x040x730x550x820 xec0x820x020x 7c0x000x9f0x360x020x000x240x9f0x270x010x800x9f0x 260x080x330x370x6f 0xbd0x790x960x650xe50x9f0x 100x130x070x010x010x030xa40xb80x040x010x0a0x010 x000x 000x200x000x000xb10x910xcc0xd20x9f0x340x03 0x010x000x020x9f0x410x040x000x000x00 0x010x84 0x070xa00x000x000x030x330x010x010x9f0x090x020x 000x8c0x9c0x010x000x5f0x2 a0x020x010x560x9f0x1 a0x020x010x560x9f0x030x060x000x000x000x000x000x 000x9f0x330x 030xa00xc80xc80x9f0x350x010x340x9f0x 1e0x080x000x000x000x000x000x000x000x000x9f0 x02-0x060x000x000x000x010x230x000x900x00", the client obtains the first transaction result "0x02" from the transaction message and determines that the first transaction result is online request.

Step 226, the client displays information of failed transaction, process is ended.

Step 227, the client sends an instruction request to the visual financial IC card.

Step 228, the visual financial IC card organizes response message.

Step 229, the visual financial IC card sends the response message to the client.

In this case, the response message includes application PAN, application PAN sequence number, second equivalent magnetic track, online transaction PIN ciphertext and service point input way code; in the present embodiment, the service point input way code is a fixed value.

For example, the response message which is organized by the financial visual card and sent to the client is:

"0x5a0x080x620x280x000x010x000x000x110x170x5f 0x340x010x010x570x110x620x280 x000x010x000x 000x 110x170xd30x010x220x010x010x230x450x670x890x990 x080xa40x010x5 80xf10xb40x710x3e0xc20x ff0x040x 020x050x100x900x00", in which "0x5a0x080x620x280x000x010x000x000 x110x17" is application PAN, "0x5f0x340x010x01" is application PAN sequence number, "0x570x110x 620x280x000x010x000x000x110x170xd30x010x220x010 x010x230x450x670x89" is the second equivalent magnetic track, "0x990x080xa40x010x580xf10xb40x710x3e0xc2" is online transaction PIN ciphertext, "0xff0x040x 020x050x10" is service point input way code.

Step 230, the client organizes online message according to the transaction message and the response message.

Step 231, the client sends the online message to the server. In this case, the online message includes message type, message length and message content.

For example, the online message organized by the client and sent to the server is:

"0x100x010x940x950x050x080x800x000x000x000x9 a0x030x160x030x220x9f0x370x040 x730x550x820xec0x 820x020x7c0x000x9f0x360x020x000x240x9f0x270x010 x800x9f0x260x08 0x330x370x6f0xbd0x790x960x650x e 50x9f0x100x130x070x010x010x030xa40xb80x040x010x 0a0x010x000x000x200x000x000xb10x910xcc0xd20x9f0 x340x030x010x000x020x9f0x410x040 x000x000x 000x 010x840x070xa00x000x000x030x330x010x010x9f0x090 x020x000x8c0x9c0x0 10x000x5f0x2a0x020x010x560x 9f0x1a0x020x010x560x9f0x030x060x000x000x000x000 x000x 000x9f0x330x030xa00xc80xc80x9f0x350x010x340 x9f 0x1e0x080x000x000x000x000x000x000 x000x000x 9f0x020x060x000x000x000x010x230x000x5a0x080x62- 0x280x000x010x000x000x1 10x170x5f0x340x010x010x 570x110x620x280x000x010x000x000x110x170xd30x010 x220x010 x010x230x450x670x890x990x080xa40x010x 58 0xf10xb40x710x3e0xc20xff0x040x020x050x10 0x900x 00", in which the first byte "0x10" is message type, the following two bytes "0x010x32" are message length, which represent the length of the data afterwards is 196 bytes.

Step 232, the server determines whether the type of the online message is correct, if yes, executes Step 233; otherwise, executes Step 240.

Specifically, the server obtains message type from the online message, determines whether the value of the message type is the sixth preset value, if yes, the server determines that the type of the online message is correct; otherwise, the server determines that the type of the online message is not correct.

For example, the sixth preset value is "0x10", the online message received by the server is: "0x100x010x 940x950x050x080x800x000x000x000x9a0x030x160x03- 0x220x9f0x370x040x730 x550x820xec0x820x020x7c 0x000x9f0x360x020x000x240x9f0x270x010x800x9f0x26- 0x080x33 0x370x6f0xbd0x790x960x650xe50x9f0x100 x1 30x 070x010x010x030xa40xb80x040x010x0a0x0 10x00 0x000x200x000x000xb10x910xcc0xd20x9f0x340x030x 010x000x020x9f0x410x040x000 x000x000x010x840x 070xa00x000x000x030x330x010x010x9f0x090x020x000- x8c0x9c0x010x0 00x5f0x2a0x020x010x560x9f0x1 a0x 020x010x560x9f0x030x060x000x000x000x000x000x000x 9f0x330x030xa00xc80xc80x9f0x350x010x340x9f0x1e0x 080x000x000x000x000x000x000x000 x000x9f0x020x 060 x 000x000x000x010x230x000x5a0x080x620x280x000 x0

10 x000x000x110x1 70x5f0x340x010x010x570x 110x 620x280x000x010x000x000x110x170xd30x010x220x010 x010 x230x450x670x890x990x080xa40x010x580xf10xb40 x710x3e0xc20xff0x040x020x050x100x90 0x00", the server obtains the first byte of the online message and takes the first byte as message type, determines the value of the message type is "0x10", therefore the type of the online message is determined to be correct.

Step 233, the server analyzes the online message.

Specifically, the server reads message content from the online message according to message length in the online message, transforms the message content to be TLV object MAP.

Step 234, the server determines whether analyzing the online message is successful, if yes, executes Step 235; otherwise, executes Step 240.

Step 235, the server determines whether a necessary data item is included in the online message, if yes, executes Step 236; otherwise, executes Step 240.

Specifically, the server searches for the necessary data item from the MAP obtained by transforming, the necessary data can include online PIN ciphertext, application PAN, transaction type, application ciphertext, the application transaction counter, the terminal verification result and the transaction amount.

For example, the server can search for a tag value of the necessary data item from the MAP obtained by transforming, if all of the tag values are found, the server determines that the online message includes the necessary data item; otherwise, the server determines that the online message does not include the necessary data item;

Further, the tag value of the online PIN cryptogram is "0x99", the tag value of the application PAN is "0x5a", the tag value of the transaction type is "0x9c", the tag value of the application ciphertext is "0x9f0x26", the tag value of the application transaction counter is "0x9f0x36", the tag value of the terminal verifying result is "0x95", the tag value of authorization amount is "0x9f0x02".

Step 236, the server verifies the necessary data item in the online message, if verifying is successful, executes Step 237; otherwise, executes Step 240.

Specifically, the server can determine whether a record of PAN tag value exists in a server database, if yes, verifying the PAN tag value is determined to be successful; otherwise, verifying the PAN tag value is determined to be unsuccessful; the server further can determine whether the authorized amount is more than a card balance in the server database, if yes, the authorized amount is determined to be successful; otherwise, the authorization amount is determined to be unsuccessful.

Step 237, the server organizes an online response package.

In this case, the online response package can include an online result and an authorization response code; the online package can further include card issuer script and card issuer authorization data.

For example, the online response package is "0x000x8a0x020x300x30", in this case, "0x00" is the online result representing normal online; "0x8a0x020x300x30" is the authorization code.

Step 238, the server determines whether online response package is successfully organized, if yes, executes Step 239; otherwise, executes Step 240.

Step 239, the server sends the online response package to the client, executes Step 242.

Step 240, the server organizes an error response package.

For example, the server organizes the error response package 0x8a0x020x350x35.

Step 241, the server sends the error response package to the client.

Step 242, the client checks a response returned from the server, if the response is the error response package, executes Step 243; if the response is the online response package, executes Step 244.

Step 243, the client displays corresponding error information and ends process.

Step 244, the client sends the online response package to the visual financial IC card.

Step 245, the visual financial IC card executes completing processing operation according to the online response package sent by the client and obtains a completing processing result, sets a second transaction result according to the completing processing result and displays corresponding information according to the second transaction result.

In this case, the completing processing result can include ciphertext information data, application ciphertext, application transaction counter, card issuer application data; in this case, the application ciphertext can be transaction certificate (TC) or AAC.

When the application ciphertext is TC in the completing processing result, the second transaction result is set to be approving transaction; when the application ciphertext in the completing processing result is AAC, the second transaction result is set to be refusing transaction;

when the second transaction result is approving transaction, the visual financial IC card displays information of successful transaction; when the second transaction result is refusing transaction, the visual financial IC card displays information of refusing transaction.

It should be noted that, when the online response package received by the visual financial IC card from the client includes the card issuer script, after Step 245, the method further includes that the visual financial IC card executes the card issuer script, displays corresponding error information when executing is error; when the online response package received by the visual financial IC card from the client includes the card issuer authorization data, before Step 245 the method further includes that the visual financial IC card verifies the card issuer authorization data;

Specifically, the card issuer script can include one or more pieces of card issuer script command; executing the card issuer script by the visual financial IC card specifically includes that the visual financial IC card executes the card issuer script commands in the card issuer script sequentially; for example, the card issuer script includes a command of modifying data command, the visual financial IC card executes the command of modifying data command and modifies the electronic cash balance in the visual financial IC card.

Step 246, the visual financial IC card organizes data package according to the second transaction result.

In this case, the data package can include a second transaction result, the terminal verification result (TVR), the application transaction counter (ATC), the ciphertext information data (CID), the application ciphertext (AC) and the card issuer application data; the data package can further include a result of executing card issuer script.

For example, the data package sent by the visual financial IC card to the client is:

"0x000x950x050x080x800x000x800x000x9f0x360x02 0x000x3c0x9f0x270x010x400x9f0x260x080x3f0xd40x5d 0x670x430x080x9b0x320x9f0x100x080x070x010x010x0 30x640xbc0x04 0x01", in which the first byte "0x00" is the second transaction result representing approving transaction; "0x950x050x080x800x000x800x00" is the terminal verifying result, "0x9f0x360x020x000x3c" is the application transaction counter, "0x9f0x270x010x40" is ciphertext information data, "0x9f0x260x080x3f0xd40x5d0x670x430 x080x9b 0x32" is application ciphertext, "0x9f0x 100x080x070x010x010x030x640xbc0x040x01" is card issuer application data.

Step 247, the visual financial IC card sends the data package to the client.

Step 248, the client obtains the second transaction result from the data package.

Step 249, the client determines whether the transaction is approved according to the second transaction result, if yes, executes Step 250; otherwise, executes Step 251.

Step 250, the client prints transaction credit, displays information of successful transaction, ends process.

Step 251, the client displays information of refusing transaction, ends process.

Embodiment 3

Figure 7:
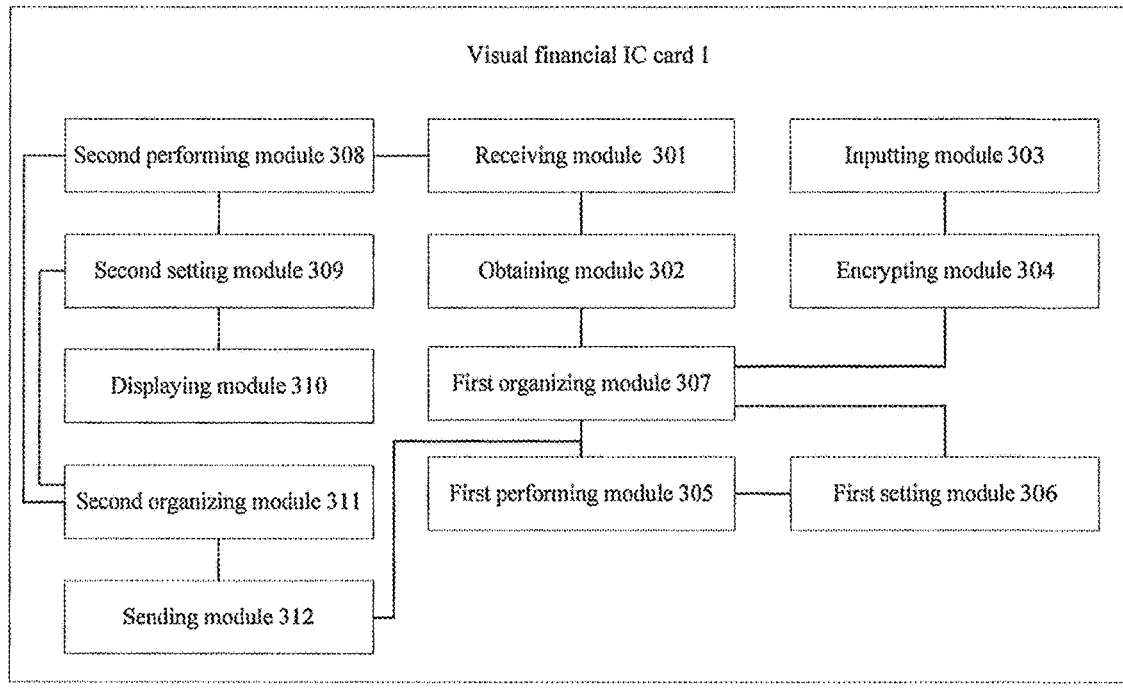
FIG. 7 is a frame chart of a visual financial IC card of Embodiment 3 of the present invention.

Embodiment 3 provides a visual financial IC card 1, a client 2 and a server 3. As shown in FIG. 7, the visual financial IC card 1 specifically includes:

a receiving module 301 configured to receive transaction transferring data and an online response package sent from the client 2;

an obtaining module 302 configured to obtain transaction data from the transaction transferring data received by the receiving module 301;

an inputting module 303 configured to receive an online PIN input by a user;

an encrypting module 304 configured to encrypt the received online PIN received by the inputting module 303 to obtain online PIN ciphertext;

a first performing module 305 configured to perform behavior analyzing to obtain a card behavior analyzing result;

a first setting module 306 configured to set a first transaction result according to the card behavior analyzing result obtained by the first performing module 305;

a first organizing module 307 configured to organize message according to the first transaction result set by the first setting module 306, the card analyzing result obtained by the first performing module 305, the transaction data obtained by the obtaining module 302 and the online PIN obtained by the encrypting module 304;

a second performing module 308 configured to perform completing processing according to the online response received by the receiving module 301 to obtain a completing processing result;

a second setting module 309 configured to set a second transaction result according to the completing processing result obtained by the second performing module 308;

a displaying module 310 configured to display corresponding information according to the second transaction result set by the second setting module 309;

a second organizing module 311 configured to organize data package according to the second transaction result set by the second setting module 309 and the completing processing result obtained by the second performing module 308; and a sending module 312 configured to send the message organized by the first organizing module 307 and the data package organized by the second organizing module 311 to the client 2.

In Embodiment 3, the visual financial IC card 1 further includes a first determining module configured to determine whether the transaction transferring data received by the receiving module 301 is complete; correspondingly, the inputting module 303 is specifically configured to receive an online PIN input by the user in the case that a determining result of the first determining module is complete; the sending module 312 is further configured to return error information to the client in the case that the determining result of the second determining module is not complete.

Preferably, the first determining module specifically is configured to determine whether the length of the transaction data in the transaction transferring data received by the receiving module 301 is equal to transaction data length in the transaction transferring data, if yes, the transaction transferring data received by the receiving module 301 is complete; otherwise, the transaction transferring data received by the receiving module 301 is not complete.

In Embodiment 3, the visual financial IC card further can include a second determining module; the second determining module configured to determine whether format of the transaction transferring data received by the receiving module 301 is correct; correspondingly, the inputting module 303 specifically configured to receive an online PIN input by the user in the case that a determining result of the second determining module is correct; and the sending module 312 is further configured to return error information to the client in the case that the determining result of the second determining module is not correct.

Preferably, the second determining module specifically includes: a determining unit configured to determine whether the transaction amount in the transaction data obtained by the obtaining module 302 matches the transaction type in the transaction data; a confirming unit configured to confirm the format of the transaction transferring data received by the receiving module 301 is correct in the case that the determining result of the determining unit is matched; confirm the format of the transaction transferring data received by the receiving module 301 is not matched;

Further, the determining unit specifically is configured to determine whether the transaction amount in the transaction data is zero in the case that the transaction type in the transaction data obtained by the obtaining module 302 is consumption, if yes, the transaction amount in the transaction data obtained by the obtaining module 302 does not match the transaction type in the transaction data; otherwise, the transaction amount in the transaction data obtained by the obtaining module 302 matches the transaction type in the transaction data; determine whether the transaction amount in the transaction transferring data is zero, in the case that the transaction type in the transaction data obtained by the obtaining module 302 is checking main account balance, if yes, the transaction amount in the transaction data obtained by the obtaining module 302 matches the transaction type in the transaction data; otherwise, the transaction amount in the transaction data obtained by the obtaining module 302 does not match the transaction type in the transaction data.

In Embodiment 3, the visual financial IC card further includes a third determining module configured to determine whether a transaction amount is required to be confirmed by the user; correspondingly, the displaying module 310 further configured to display the transaction amount in the transaction data obtained by the obtaining module 302 in the case that determining result of the third determining module is that the transaction amount is required to be confirmed by the user; and the inputting module 303 further configured to receive a transaction amount confirming information input by the user in the case that the determining result of the third determining module is that the transaction amount is required to be confirmed by the user.

Preferably, the third determining module specifically is configured to determine the transaction type in the transaction data obtained by the obtaining module 302, if the transaction type is consumption, the user is required to confirm transaction amount; if the transaction type is checking main account balance, the user is not required to confirm the transaction amount.

In Embodiment 3, the visual financial IC card can include a fourth determining module and a caching module; the caching module is configured to cache the online PIN received by the inputting module 303; the fourth determining module specifically comprises:
    a first determining unit configured to determine whether the transaction amount in the transaction data obtained by the obtaining module 302 is more that a preset amount;
    a second determining module configured to determine whether a cached online PIN exists in the case that the determining result of the first determining unit is no;
    a reading unit configured to read the cached online PIN in the case that the determining result of the second determining unit is no;
    an encrypting unit configured to encrypt the online PIN read by the reading unit to obtain online PIN ciphertext;
    Correspondingly, the inputting module 303 specifically is configured to receive the online PIN input by the user in the case that the determining result of the first determining result is yes or the determining result of the second determining unit is no.

In Embodiment 3, the first setting module 306 specifically is configured to check application ciphertext in the card behavior analyzing result obtained by the first performing module 305, set the first transaction result as an online request if the application ciphertext is authorization request ciphertext; set the first transaction result as refusing transaction if the application ciphertext is application authentication ciphertext.

Correspondingly, in Embodiment 3, the visual financial IC card can further include: a refusing module configured to refuse transaction in the case that the first transaction result set by the first setting module 306 is refusing transaction; the displaying module 310 further configured to display information of refusing transaction in the case that the first transaction result set by the first setting module 309 is refusing transaction.

In Embodiment 3, the receiving module 301 further is configured to receive an instruction request sent by the client; correspondingly,
    the first organizing module 307 can specifically include:
    a first organizing unit configured to organize transaction message according to the first transaction result set by the first setting module 306, the behavior analyzing result obtained by the first performing module 305 and the transaction data obtained by the obtaining module 302;
    a second organizing unit configured to organize response message according to the online PIN ciphertext obtained by the encrypting module 304 in the case that the receiving module 301 receives an instruction request; and
    the sending module 312 specifically is configured to send the transaction message organized by the first organizing unit and the response message organized by the second organizing unit to the client 2.

In Embodiment 3, the second setting module 309 can specifically be configured to check the application ciphertext in the completing processing result obtained by the second performing module 308; if the application ciphertext is transaction certificate, the second transaction result is set to be approving transaction; if the application ciphertext is application authentication ciphertext, the second transaction result is set to be refusing transaction;

Further, the displaying module 310 can specifically be configured to display information of successful transaction in the case that the second transaction result set by the second setting module 309 is approving transaction; displaying information of refusing transaction in the case that the second transaction result set by the second setting module 309 is refusing transaction.

In Embodiment 3, the visual financial IC card further comprises:

a first checking module which is configured to check whether card issuer authorization data included in the online response package received by the receiving module 301;

the authenticating module is configured to authenticate the card issuer authorization data included in the online response package received by the receiving module 301 in the case that the checking result of the first checking module is that the card issuer authorization data is included in the online response package received by the receiving module.

In Embodiment 3, the visual financial IC card further includes:

the second checking module is configured to check whether card issuer script is included in the online response package received by the receiving module 301;

the third performing module is configured to perform the card issuer script in the online response package received by the receiving module 301 in the case that the result of the second checking module is that the card issuer script is included in the online response package received by the receiving module 301;

the second organizing module 311 specifically is configured to organize data package according to the second transaction result set by the second setting module 309, the performing result of the third performing module and the completing processing result obtained by the second performing module 308;

the displaying module 310 is further configured to display corresponding error information in the case that the performing result of the third performing result is error.

Figure 8:
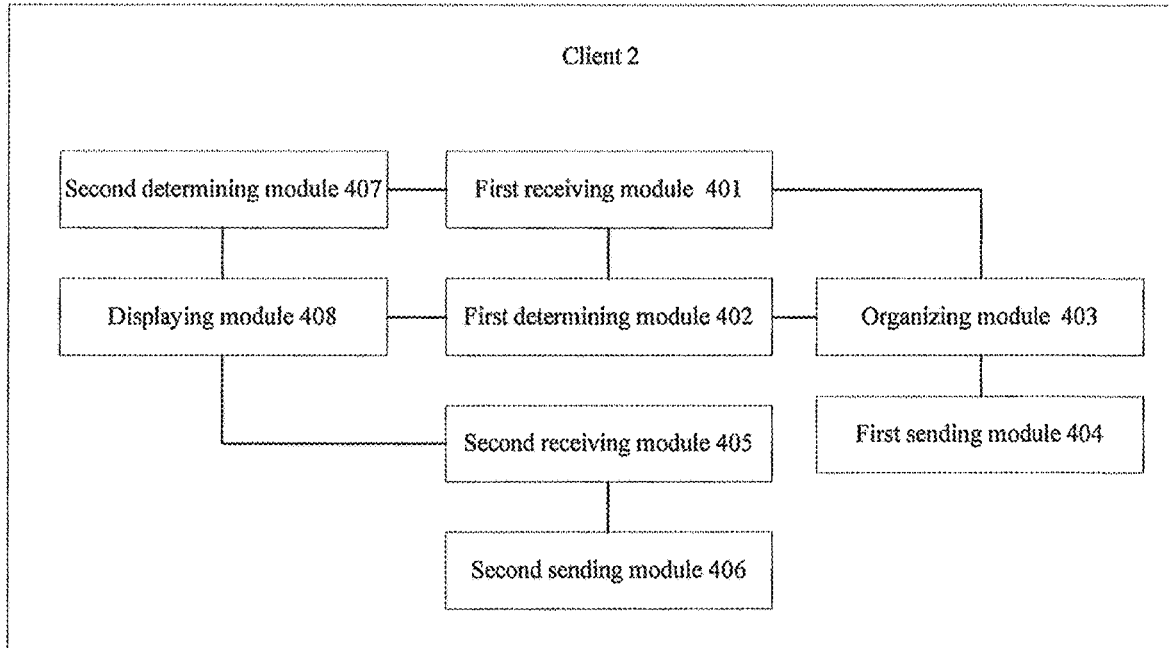
FIG. 8 is a frame chart of a client of Embodiment 3 of the present invention.

As shown in FIG. 8, Embodiment 3 of the present invention further provides a client 2 which includes:

a first receiving module 401 configured to receive message and data package which are sent by the visual financial IC card 1;

a first determining module 402 configured to determine whether a first transaction result in the message received by the first receiving module 401 is an online request;

an organizing module 403 configured to organize online message according to the message received by the first receiving module 401 in the case that the determining result of the first determining module 402 is yes;

a first sending module 404 configured to send the online message organized by the organizing module 403 to the server 3;

a second receiving module 405 configured to receive a response returned by the server 3;

a second sending module 406 configured to send the online response package to the visual financial IC card 1 in the case that the response received by the second receiving module 405 is online response package;

a second determining module 407 configured to determine whether transaction is approved according to the second transaction result in the data package received by the first receiving module 401; and a displaying module 408 configured to display information of failed transaction in the case that the determining result of the first determining module 402 is no; display corresponding error information in the case that the response received by the second receiving module 405 is not online response package; display information of successful transaction in the case that the determining result of the second determining module 407 is yes; display information of refusing transaction in the case that the determining result of the second determining module 407 is "No".

In Embodiment 3, the client 2 further comprises: a printing module configured to print transaction credit in the case that the determining result of the second determining module 407 is yes.

Figure 9:
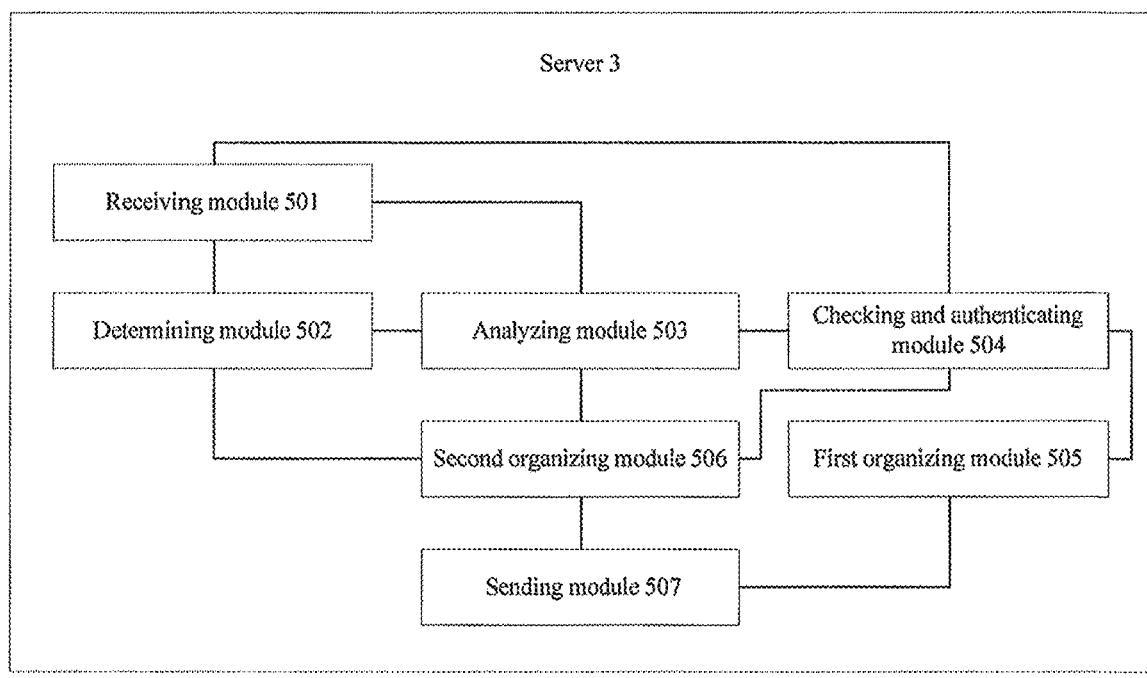
FIG. 9 is a frame chart of a server of Embodiment 3 of the present invention.

As shown in FIG. 9, Embodiment 3 further provides a server 3, which includes:

a receiving module 501 configured to receive online message sent by the client 2;

a determining module 502 configured to determine whether a type of the online message received by the receiving module 501 is correct;

an analyzing module 503 configured to analyze the online message received by the receiving module 501 in the case that the determining result of the determining module 502 is yes;

a checking and authenticating module 504 configured to check and authenticate the online message received by the receiving module 501 in the case that analyzing of the analyzing module 503 is successful, if the online message includes necessary data item and authenticating of the necessary data item is successful, checking and authenticating is successful; otherwise, checking and authenticating is not successful;

a first organizing module 505 configured to organize the online response package in the case that the checking and authenticating of the checking and authenticating module 504 is successful;

a second organizing module 506 configured to organize error response package in the case that determining result of the determining module 502 is no, the analyzing of the analyzing module 503 is not successful or the checking and authenticating of the checking and authenticating module 504 is not successful; and a sending module 507 configured to send an online response package organized by the first organizing module 505 and the error response package organized by the second organizing module 506 to the client 2.

The described embodiments are only preferred embodiments of the application and the embodiments are not intended to limit the application. Any alteration or change easily obtained by those skilled in the art based on the application should fall in the scope of protection of the application.

The invention claimed is:

1. A method of an online transaction using a visual financial chip card which can store information and display information of a cardholder and a client which is an application installed in a terminal device of the cardholder without requiring a transaction terminal, so as to improve security and convenience of the online transaction, wherein said method comprises the following steps of:

issuing the visual financial chip card to the cardholder;
S1) receiving, by the visual financial chip card which displays information with an electronic paper, transaction transferring data sent from the client, and obtaining transaction data from the transaction transferring data;
S2) receiving, by the visual financial chip card, an online PIN entered by the cardholder with a key in the visual financial chip card, encrypting the online PIN to obtain online PIN ciphertext;
S3) performing, by the visual financial chip card, behavior analyzing analysis to obtain a card behavior analyzing result, setting a first transaction result data according to the card behavior analyzing result, organizing a message according to the first transaction result data, the card behavior analyzing result, the transaction data and the online PIN ciphertext, and sending the message to the client;
S4) receiving, by the visual financial chip card, an online response package sent from the client, executing a first operation according to the online response package, so as to obtain a first operation result, setting a second transaction result data according to the first operation result, and displaying a prompting information according to the second transaction result data; and
S5) organizing, by the visual financial chip card, a data package according to the second transaction result data and the first operation result, and sending the data package to the client;
wherein the card behavior result comprises application ciphertext;
setting the first transaction result data according to the card behavior analyzing result specifically comprises: checking, by the visual financial chip card, the application ciphertext in the card behavior analyzing result, setting the first transaction result data as an online requirement in the case that the application ciphertext is authorization request ciphertext; and setting the first transaction result data as refusing transaction in the case that the application ciphertext is application authentication ciphertext;
wherein the first operation result comprises application ciphertext;
setting the second transaction result data according to the first operation result specifically comprises: checking, by the visual financial chip card, the application ciphertext in the first operation result, setting the second transaction result data as transaction approval in the case that the application ciphertext is transaction certificate, while setting the second transaction result data as refusing transaction in the case that the application ciphertext is application authentication ciphertext;
wherein after Step S4, the method further comprises the following steps:
3-1) checking, by the visual financial chip card, whether card issuer script is included in the online response package, if yes, executing step 3-2; otherwise, executing Step S5;
3-2) executing, by the visual financial chip card, the card issuer script, if executing is successful, executing step 3-3; while if executing is error, displaying error information and executing step 3-3; and
3-3) organizing, by the visual financial chip card, the data package according to the second transaction result data, executing card issuer script result and the first operation result, sending the data package obtained by organizing to the client, then ending a process; and the method further comprises the following steps:
T1) receiving, by the client, the message sent by the visual financial chip card, determining whether the first transaction result data in the message is online request, if yes, executing Step T2, otherwise, displaying information of failed transaction, ending;
T2) organizing, by the client, online message according to the message and sending the online message to a server, receiving a response returned by the server, if the response returned by the server is online response package, sending the online response package to the visual financial chip card, executing Step T3;
otherwise, displaying an error information, then ending; and
T3) receiving, by the client, the data package sent by the visual financial chip card, determining whether transaction is approved according to the second transaction result data in the data package, if yes, displaying information of successful transaction; otherwise, displaying information of refusing transaction, then ending.

2. The method of claim 1, wherein the transaction data comprises transaction amount;
before receiving the online PIN entered by the cardholder, the method further comprises: determining, by the visual financial chip card, whether to require the cardholder to confirm the transaction amount, receiving the online PIN entered by the cardholder in the case that the cardholder to confirm the transaction amount is not required; displaying the transaction amount and waiting for receiving transaction amount confirming information entered by the cardholder in the case that the cardholder to confirm the transaction amount is required;
executing receiving the online PIN in the case that the transaction amount confirming information entered by the cardholder is received; while returning error information to the client and ending in the case that the transaction amount confirming information entered by the cardholder is not received.

3. The method of claim 1, wherein the transaction data comprises transaction amount;
before receiving the online PIN entered by the cardholder, the method further comprises the following steps:
1-1) determining, by the visual financial chip card, whether the transaction amount is more than a preset amount, if yes, executing receiving the online PIN entered by the cardholder; otherwise, executing step 1-1; and
1-2) determining, by the visual financial chip card, whether a cached online PIN exists, if yes, reading the cached online PIN, encrypting the online PIN to obtain the online PIN ciphertext, executing step S3; otherwise, executing receiving the online PIN entered by the cardholder;
after receiving the online PIN entered by the cardholder, the method further comprises: caching the online PIN.

4. The method of claim 1, wherein organizing the message according to the first transaction result data, the card behavior analyzing result, the transaction data and the online PIN ciphertext specifically comprises following steps:
2-1) organizing, by the visual financial chip card, transaction message according to the first transaction result data, the card behavior analyzing result, and the transaction data, and sending the transaction message to the client; and 2-2) receiving, by the visual financial chip card, an instruction request sent by the client, organizing a response message according to the online PIN ciphertext, sending the response message to the client.

5. The method of claim 1, wherein after receiving the online response package sent from the client, and before executing the first operation so as to obtain the first operation result, the method further comprises: checking, by the visual financial chip card, whether card issuer authorization data is included in the online response package, if yes, authenticating the card issuer authorization data and keeping on performing the first operation to obtain the first operation result, otherwise, keeping on performing the first operation to obtain the first operation result.

6. The method of claim 1, wherein in Step T3, when the transaction is approved, the method further comprises: printing transaction credit.

* * * * *